(12) United States Patent
Hartwell et al.

(10) Patent No.: US 7,739,259 B2
(45) Date of Patent: Jun. 15, 2010

(54) INTEGRATED SEARCH AND FIND USER INTERFACE

(75) Inventors: Aaron Hartwell, Duvall, WA (US); Mike Pell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 11/430,561

(22) Filed: May 9, 2006

(65) Prior Publication Data

US 2007/0061307 A1      Mar. 15, 2007

Related U.S. Application Data

(60) Provisional application No. 60/716,267, filed on Sep. 12, 2005, provisional application No. 60/716,358, filed on Sep. 12, 2005, provisional application No. 60/716,236, filed on Sep. 12, 2005.

(51) Int. Cl.
    *G06F 7/00* (2006.01)
(52) U.S. Cl. .................... 707/706; 707/999.003
(58) Field of Classification Search .............. 707/3
    See application file for complete search history.

(56) References Cited

U.S. PATENT DOCUMENTS

| | | |
|---|---|---|
| 5,155,806 A | 10/1992 | Hoeber |
| 5,377,354 A | 12/1994 | Scannell |
| 5,500,936 A | 3/1996 | Allen |
| 5,519,606 A | 5/1996 | Frid-Nielsen |
| 5,559,944 A | 9/1996 | Ono |
| 5,570,109 A | 10/1996 | Jenson |
| 5,588,107 A | 12/1996 | Bowden et al. ............ 715/828 |
| 5,596,694 A | 1/1997 | Capps |
| 5,625,783 A | 4/1997 | Ezekiel et al. ............ 395/352 |
| 5,634,100 A | 5/1997 | Capps |
| 5,634,128 A | 5/1997 | Messina |
| 5,638,504 A | 6/1997 | Scott |
| 5,644,737 A | 7/1997 | Tuniman et al. ........... 715/810 |
| 5,659,693 A | 8/1997 | Hansen et al. ............. 715/779 |
| 5,664,127 A | 9/1997 | Anderson |
| 5,664,208 A | 9/1997 | Pavley |

(Continued)

FOREIGN PATENT DOCUMENTS

EP       0 910 007       4/1999

(Continued)

OTHER PUBLICATIONS

U.S. Office Action dated May 30, 2008, cited in U.S. Appl. No. 11/430,562.

(Continued)

*Primary Examiner*—John E Breene
*Assistant Examiner*—Joshua Bullock
(74) *Attorney, Agent, or Firm*—Merchant & Gould P.C.

(57) ABSTRACT

A search and find user interface is provided that is integrated with a data indexing engine to allow efficient and high-speed data search and retrieval across data storage folders associated with a given software module or associated with a number of disparate software modules. An expanded form of the search and find user interface is provided for advanced searching. Where searching is required beyond a present search scope, an automatic "upscoping" mechanism is provided for expanding a search to data storage folders outside a current data storage folder on which an initial search is executed.

18 Claims, 10 Drawing Sheets

U.S. PATENT DOCUMENTS

| | | |
|---|---|---|
| 5,721,847 A | 2/1998 | Johnson |
| 5,734,915 A | 3/1998 | Roewer ................ 395/773 |
| 5,760,768 A | 6/1998 | Gram .................. 345/333 |
| 5,760,773 A | 6/1998 | Berman |
| 5,761,646 A | 6/1998 | Frid-Nielsen |
| 5,778,402 A | 7/1998 | Gipson |
| 5,778,404 A | 7/1998 | Capps |
| 5,805,167 A | 9/1998 | Van Cruyningen |
| 5,812,132 A | 9/1998 | Goldstein ............. 715/797 |
| 5,821,936 A | 10/1998 | Shaffer |
| 5,828,376 A | 10/1998 | Solimene |
| 5,838,321 A | 11/1998 | Wolf |
| 5,842,009 A | 11/1998 | Borovoy |
| 5,844,558 A | 12/1998 | Kumar |
| 5,844,572 A | 12/1998 | Schott |
| 5,855,006 A | 12/1998 | Huemoeller |
| 5,885,006 A | 3/1999 | Sheedy |
| 5,893,125 A | 4/1999 | Shostak |
| 5,898,436 A | 4/1999 | Stewart |
| 5,899,979 A | 5/1999 | Miller |
| 5,905,863 A | 5/1999 | Knowles |
| 5,926,806 A | 7/1999 | Marshall |
| 5,936,625 A | 8/1999 | Kahl |
| 5,940,078 A | 8/1999 | Nagarajayya |
| 5,940,847 A | 8/1999 | Fein |
| 5,943,051 A | 8/1999 | Onda |
| 5,960,406 A | 9/1999 | Rasansky |
| 5,970,466 A | 10/1999 | Detjen |
| 5,999,938 A | 12/1999 | Bliss |
| 6,008,806 A | 12/1999 | Nakajima |
| 6,012,075 A | 1/2000 | Fein |
| 6,018,343 A | 1/2000 | Wang |
| 6,034,683 A | 3/2000 | Mansour |
| 6,067,087 A | 5/2000 | Krauss |
| 6,072,492 A | 6/2000 | Schagen |
| 6,085,206 A | 7/2000 | Domini |
| 6,101,480 A | 8/2000 | Conmy |
| 6,133,915 A | 10/2000 | Arcuri |
| 6,175,363 B1 | 1/2001 | Williams |
| 6,188,403 B1 | 2/2001 | Sacerdoti |
| 6,192,381 B1 | 2/2001 | Stiegemeier |
| 6,211,879 B1 | 4/2001 | Soohoo |
| 6,216,122 B1 * | 4/2001 | Elson .................. 707/3 |
| 6,219,670 B1 | 4/2001 | Mocek |
| 6,222,540 B1 | 4/2001 | Sacerdoti |
| 6,232,971 B1 | 5/2001 | Haynes |
| 6,236,396 B1 | 5/2001 | Jenson |
| 6,256,628 B1 | 7/2001 | Dobson |
| 6,278,450 B1 | 8/2001 | Arcuri et al. .......... 345/334 |
| 6,289,317 B1 | 9/2001 | Peterson |
| 6,307,544 B1 | 10/2001 | Harding |
| 6,323,883 B1 | 11/2001 | Minoura |
| 6,353,451 B1 | 3/2002 | Teibel |
| 6,359,634 B1 | 3/2002 | Cragun |
| 6,373,507 B1 | 4/2002 | Camara |
| 6,384,849 B1 | 5/2002 | Morcos |
| 6,405,216 B1 | 6/2002 | Minnaert et al. |
| 6,424,829 B1 | 7/2002 | Kraft |
| 6,429,882 B1 | 8/2002 | Abdelnur et al. ........ 345/763 |
| 6,433,801 B1 | 8/2002 | Moon et al. ........... 345/840 |
| 6,456,304 B1 | 9/2002 | Angiulo |
| 6,459,441 B1 | 10/2002 | Perroux et al. ......... 345/837 |
| 6,466,236 B1 | 10/2002 | Pivowar |
| 6,469,722 B1 | 10/2002 | Kinoe |
| 6,480,865 B1 | 11/2002 | Lee |
| 6,493,006 B1 | 12/2002 | Gourdol |
| 6,493,731 B1 | 12/2002 | Jones |
| 6,546,417 B1 | 4/2003 | Baker |
| 6,570,596 B2 | 5/2003 | Frederiksen |
| 6,578,192 B1 | 6/2003 | Boehme |
| 6,583,798 B1 | 6/2003 | Hoek |
| 6,618,732 B1 | 9/2003 | White |
| 6,621,504 B1 | 9/2003 | Nadas |
| 6,621,508 B1 | 9/2003 | Shiraishi |
| 6,635,089 B1 | 10/2003 | Burkett |
| 6,664,983 B2 | 12/2003 | Ludolph |
| 6,680,749 B1 | 1/2004 | Anderson |
| 6,686,938 B1 | 2/2004 | Jobs et al. ............ 345/835 |
| 6,708,205 B2 | 3/2004 | Sheldon |
| 6,727,919 B1 | 4/2004 | Reder |
| 6,732,330 B1 | 5/2004 | Claussen |
| 6,734,880 B2 | 5/2004 | Chang |
| 6,750,890 B1 | 6/2004 | Sugimoto |
| 6,785,868 B1 | 8/2004 | Raff |
| 6,825,859 B1 | 11/2004 | Severenuk |
| 6,826,729 B1 | 11/2004 | Giesen |
| 6,850,255 B2 | 2/2005 | Muschetto |
| 6,871,195 B2 | 3/2005 | Ryan |
| 6,882,354 B1 | 4/2005 | Nielsen |
| 6,904,449 B1 | 6/2005 | Quinones |
| 6,906,717 B2 | 6/2005 | Couckuyt |
| 6,915,492 B2 | 7/2005 | Kurtenbach |
| 6,924,797 B1 | 8/2005 | MacPhail ............. 345/326 |
| 6,964,025 B2 | 11/2005 | Angiulo |
| 6,983,889 B2 | 1/2006 | Alles |
| 6,988,241 B1 | 1/2006 | Guttman |
| 6,990,637 B2 | 1/2006 | Anthony |
| 7,027,463 B2 | 4/2006 | Mathew et al. |
| 7,032,210 B2 | 4/2006 | Alloing et al. .......... 717/106 |
| 7,039,596 B1 | 5/2006 | Lu |
| 7,046,848 B1 | 5/2006 | Olcott |
| 7,107,544 B1 | 9/2006 | Luke |
| 7,110,936 B2 | 9/2006 | Hiew |
| 7,111,238 B1 | 9/2006 | Kuppusamy |
| 7,152,207 B1 | 12/2006 | Underwood |
| 6,691,281 B1 | 2/2007 | Sorge |
| 7,188,073 B1 | 3/2007 | Tam |
| 7,212,208 B2 | 5/2007 | Khozai |
| 7,216,301 B2 | 5/2007 | Moehrle |
| 7,249,325 B1 | 7/2007 | Donaldson |
| 7,325,204 B2 | 1/2008 | Rogers |
| 7,328,409 B2 | 2/2008 | Awada |
| 7,337,185 B2 | 2/2008 | Ellis et al. ............ 707/102 |
| 7,346,705 B2 | 3/2008 | Hullot |
| 7,346,769 B2 | 3/2008 | Forlenza |
| 7,360,174 B2 * | 4/2008 | Grossman et al. ....... 715/854 |
| 7,386,535 B1 | 6/2008 | Kalucha et al. |
| 7,392,249 B1 | 6/2008 | Harris et al. |
| 7,469,385 B2 | 12/2008 | Harper et al. |
| 7,484,213 B2 | 1/2009 | Mathew et al. |
| 7,505,954 B2 | 3/2009 | Heidloff |
| 7,530,029 B2 | 5/2009 | Satterfield |
| 7,567,964 B2 | 7/2009 | Brice |
| 7,627,561 B2 | 12/2009 | Pell |
| 2002/0007380 A1 | 1/2002 | Bauchot |
| 2002/0037754 A1 | 3/2002 | Hama |
| 2002/0052721 A1 | 5/2002 | Ruff |
| 2002/0070977 A1 | 6/2002 | Morcos |
| 2002/0075330 A1 | 6/2002 | Rosenzweig |
| 2002/0078143 A1 | 6/2002 | De Boor |
| 2002/0091739 A1 | 7/2002 | Ferlitsch |
| 2002/0122071 A1 | 9/2002 | Camara |
| 2002/0133557 A1 | 9/2002 | Winarski |
| 2002/0135621 A1 | 9/2002 | Angiulo |
| 2002/0140731 A1 | 10/2002 | Subramaniam et al. ..... 345/762 |
| 2002/0140740 A1 | 10/2002 | Chen |
| 2002/0149623 A1 | 10/2002 | West |
| 2002/0149629 A1 | 10/2002 | Craycroft |
| 2002/0154178 A1 | 10/2002 | Barnett |
| 2002/0163538 A1 | 11/2002 | Shteyn |
| 2002/0175955 A1 | 11/2002 | Gourdol |
| 2002/0196293 A1 | 12/2002 | Suppan et al. .......... 345/853 |
| 2003/0011638 A1 | 1/2003 | Chung |
| 2003/0011639 A1 | 1/2003 | Webb |

| | | |
|---|---|---|
| 2003/0014490 A1 | 1/2003 | Bates |
| 2003/0022700 A1 | 1/2003 | Wang |
| 2003/0035917 A1 | 2/2003 | Hyman |
| 2003/0038832 A1 | 2/2003 | Sobol |
| 2003/0043211 A1 | 3/2003 | Kremer |
| 2003/0066025 A1 | 4/2003 | Garner |
| 2003/0070143 A1 | 4/2003 | Maslov .................. 715/513 |
| 2003/0093490 A1 | 5/2003 | Yamamoto |
| 2003/0097361 A1 | 5/2003 | Huang |
| 2003/0098891 A1 | 5/2003 | Molander |
| 2003/0110191 A1 | 6/2003 | Handsaker |
| 2003/0112278 A1 | 6/2003 | Driskell |
| 2003/0163455 A1 | 8/2003 | Dettinger et al. |
| 2003/0167310 A1 | 9/2003 | Moody |
| 2003/0169284 A1 | 9/2003 | Dettinger et al. |
| 2003/0195937 A1 | 10/2003 | Kircher |
| 2003/0206646 A1 | 11/2003 | Brackett |
| 2003/0218611 A1 | 11/2003 | Ben-Tovim |
| 2003/0226106 A1 | 12/2003 | McKellar |
| 2003/0227487 A1 | 12/2003 | Hugh ..................... 345/777 |
| 2003/0233419 A1 | 12/2003 | Beringer |
| 2004/0003351 A1 | 1/2004 | Sommerer et al. ......... 715/517 |
| 2004/0012633 A1 | 1/2004 | Helt |
| 2004/0056894 A1 | 3/2004 | Zaika |
| 2004/0090315 A1 | 5/2004 | Mackjust |
| 2004/0100504 A1 | 5/2004 | Sommer |
| 2004/0100505 A1 | 5/2004 | Cazier |
| 2004/0107197 A1 | 6/2004 | Shen |
| 2004/0109025 A1 | 6/2004 | Hullot |
| 2004/0109033 A1 | 6/2004 | Vienneau et al. ......... 345/863 |
| 2004/0117451 A1 | 6/2004 | Chung |
| 2004/0119760 A1* | 6/2004 | Grossman et al. ......... 345/854 |
| 2004/0128275 A1 | 7/2004 | Moehrle |
| 2004/0133854 A1 | 7/2004 | Black |
| 2004/0142720 A1 | 7/2004 | Smethers |
| 2004/0164983 A1 | 8/2004 | Khozai |
| 2004/0168153 A1 | 8/2004 | Marvin |
| 2004/0186775 A1 | 9/2004 | Margiloff |
| 2004/0189694 A1 | 9/2004 | Kurtz |
| 2004/0221234 A1 | 11/2004 | Imai |
| 2004/0230508 A1 | 11/2004 | Minnis |
| 2004/0230906 A1 | 11/2004 | Pik |
| 2004/0239700 A1 | 12/2004 | Baschy |
| 2004/0243938 A1* | 12/2004 | Weise et al. .............. 715/526 |
| 2004/0268231 A1 | 12/2004 | Tunning ................. 715/513 |
| 2005/0004990 A1 | 1/2005 | Durazo |
| 2005/0005249 A1 | 1/2005 | Hill |
| 2005/0010871 A1 | 1/2005 | Ruthfield et al. .......... 715/712 |
| 2005/0021504 A1 | 1/2005 | Atchison |
| 2005/0022116 A1 | 1/2005 | Bowman |
| 2005/0039142 A1 | 2/2005 | Jalon |
| 2005/0043015 A1 | 2/2005 | Muramatsu |
| 2005/0044500 A1 | 2/2005 | Orimoto et al. |
| 2005/0057584 A1 | 3/2005 | Gruen et al. |
| 2005/0086135 A1 | 4/2005 | Lu |
| 2005/0117179 A1 | 6/2005 | Ito |
| 2005/0138576 A1 | 6/2005 | Baumert |
| 2005/0144241 A1 | 6/2005 | Stata et al. |
| 2005/0172262 A1 | 8/2005 | Lalwani |
| 2005/0183008 A1 | 8/2005 | Crider et al. ............. 715/517 |
| 2005/0216863 A1 | 9/2005 | Schumacher |
| 2005/0223329 A1 | 10/2005 | Schwartz |
| 2005/0256867 A1 | 11/2005 | Walther et al. ............ 707/5 |
| 2005/0278656 A1 | 12/2005 | Goldthwaite |
| 2005/0289156 A1 | 12/2005 | Maryka |
| 2006/0020962 A1 | 1/2006 | Stark |
| 2006/0036580 A1 | 2/2006 | Stata |
| 2006/0036945 A1 | 2/2006 | Radtke |
| 2006/0036965 A1 | 2/2006 | Harris |
| 2006/0041545 A1 | 2/2006 | Heidloff et al. ............ 707/4 |
| 2006/0047644 A1 | 3/2006 | Bocking et al. |
| 2006/0080303 A1* | 4/2006 | Sargent et al. ............ 707/3 |
| 2006/0095865 A1 | 5/2006 | Rostom |
| 2006/0101051 A1 | 5/2006 | Carr |
| 2006/0101350 A1 | 5/2006 | Scott |
| 2006/0111931 A1 | 5/2006 | Johnson |
| 2006/0117249 A1 | 6/2006 | Hu |
| 2006/0129937 A1 | 6/2006 | Shafron |
| 2006/0173824 A1 | 8/2006 | Bensky |
| 2006/0218500 A1 | 9/2006 | Sauve |
| 2006/0242557 A1 | 10/2006 | Nortis III |
| 2006/0242575 A1 | 10/2006 | Winser |
| 2006/0294452 A1 | 12/2006 | Matsumoto |
| 2007/0050401 A1 | 3/2007 | Young |
| 2007/0061306 A1 | 3/2007 | Pell |
| 2007/0061308 A1 | 3/2007 | Hartwell |
| 2007/0106951 A1 | 5/2007 | McCormack |
| 2007/0143671 A1 | 6/2007 | Paterson |
| 2007/0185826 A1 | 8/2007 | Brice et al. .................. 707/1 |
| 2007/0240057 A1 | 10/2007 | Satterfield |
| 2007/0260996 A1 | 11/2007 | Jakobson |
| 2007/0279417 A1 | 12/2007 | Garg |
| 2007/0300168 A1 | 12/2007 | Bosma |
| 2008/0034304 A1 | 2/2008 | Feuerbacher |
| 2008/0040682 A1 | 2/2008 | Sorenson |
| 2008/0052670 A1 | 2/2008 | Espinosa |
| 2008/0077571 A1 | 3/2008 | Harris |
| 2008/0178110 A1 | 7/2008 | Hill |
| 2009/0007003 A1 | 1/2009 | Dukhon |
| 2009/0083656 A1 | 3/2009 | Dukhon |
| 2009/0100009 A1 | 4/2009 | Karp |
| 2009/0217192 A1 | 8/2009 | Dean |
| 2009/0222763 A1 | 9/2009 | Dukhon |

FOREIGN PATENT DOCUMENTS

| | | |
|---|---|---|
| EP | 1 672 518 | 6/2001 |
| EP | 1223503 | 7/2002 |
| EP | 1376337 | 2/2004 |
| EP | 1 835 434 A1 | 9/2007 |
| GB | 2391148 | 1/2004 |
| WO | WO 99/04353 | 1/1999 |
| WO | WO 99/27495 | 6/1999 |
| WO | WO 02/091162 | 11/2002 |
| WO | WO 02/091162 A2 | 11/2002 |
| WO | WO 02/091162 A3 | 11/2002 |
| WO | WO 03/098500 | 11/2003 |

OTHER PUBLICATIONS

U.S. Office Action dated Jun. 27, 2008, cited in U.S. Appl. No. 11/430,416.
David Pogue, Windows XP Home Edition: The Missing Manual, O'Reilly, $1_{st}$Edition, May 1, 2002, pp. 37, 38, and 41.
PCT International Search Report in PCT/US2006/035467 dated Feb. 6, 2007.
U.S. Final Office Action dated Jul. 9, 2008 for U.S. Appl. No. 11/136,800.
PCT International Search Report in PCT/US2006/035467 dated Sep. 12, 2006.
PCT Written Opinion in PCT/US2006/035467 dated Sep. 12, 2006.
Official Action dated Sep. 6, 2007 for U.S. Appl. No. 11/136,800.
Microsoft Press, Microsoft Computer Dictionary, Microsoft Press, Fifth Edition, pp. 374, 382.
Charles Rich, Candace L. Sidner, "Segmented Interaction History in a Collaborative Interface Agent," 1997 ACM, pp. 23-30.
Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.

Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Office, Sep. 19, 2006.
Boyce, "Microsoft Outlook Inside Out," 2001, pp. 133, 134, 721-728.
Halvorson and Young, "Microsoft Office XP Inside Out," 2001, pp. 4, 5, 10, 11, 70-74, 281-288, 1010-1014, 1173-1175.
Riggsby, McCoy, Haberman and Falciani, "Mastering Lotus Notes and Domino 6," 2003, pp. 18, 22, 33-35, 47, 122, 123, 215-241, 378.
"About Google Desktop Search," http://www.desktop.google.com/about.html, Oct. 15, 2004 (8 pages).
"Lookout," http://www.lookoutsoft.com, Apr. 22, 2005 (20 pages).
"Yahoo to test desktop search," http://news.com.com/yahoo+to+test+desktop+searach/2100-1032_3-5486381.html, Dec. 9, 2004 (6 pages).
"Microsoft reinvents its own wheel," http://www.theinquirer.net/default.aspx?article=20214, Dec. 14, 2004 (5 pages).
"MSN Desktop Search (beta)," http://www.pcmag.com/article2/0,1895,1771841.00.asp, Mar. 2, 2005.
"Windows Desktop Search," http://kunal.kundaje.net/reviews/wds.html, Jul. 10, 2005 (7 pages).
"Microsoft Enters Desktop Search Fray," http://www.internetnews.com/ent-news/article.php/3447331, Dec. 13, 2004 (5 pages).
"Primary Windows," http://www-03.ibm.com/servers/eserver/iseries/navigator/guidelines/primary.html,_, (23 pages).
"User Interface Standards," http://msdn2.microsoftt.com/en-us/library/aa217660(office.11,d= printer).aspx, Sep. 2001 (5 pages).
"WebSphere Studio Overview," http://researchweb.watson.ibm.com/journal/sj/432/budinsky.html, May 6, 2004 (25 pages).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
U.S. Non-Final Office Acton dated Jun. 19, 2009 for U.S. Appl. No. 11/430,562.
"Find any file or email on your PC as fast as you can type!" http://www.xl.com, 2003, (1 page).
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme - Trolltech, http://trolltech.com/customers/casestories/stories/sourcextreme/?searchterm=sourcextreme, 2 pages (Date Printed Apr. 22, 2008).
"External Style Sheets," http://www.webreference.com/html/tutorial5/9.html, Aug. 20, 1998, 3 pgs.
"ID & Class Selectors, Pseudoclasses," http://www.webreference.com/html/tutorial5/6.html, Aug. 20, 1998, 3 pgs.
"Inter-Widget Communication," http://web.mit.edu/6.115/www/miscfiles/amulet/amulet-help/IWC.htm, 6 pages (Feb. 13, 2007).
"Microsoft Outlook 2000: Introduction to Calendar," Version 2002.03.25, http://www.uakron.edu/its/learning/training/docs/Calendar032502.pdf, Mar. 25, 2002, pp. 1-52.
"Primary Windows," http://www-03.ibm.com/servers/eserver/iseries/navigator/guidelines/primary.html, 23 pgs.
"Separate Structure and Presentation," http://www.webreference.com/html/tutorial5/1.html, Aug. 20, 1998, 4 pgs.
"TeeChart for .NET Charting Control," TeeChart for NET Steema Software. http://Iwww.teechart.net.
"The Style Attribute and CSS Declarations," http://www.webreference.com/html/tutorial5/2, Aug. 20, 1998, 4 pgs.
"The Style Element & CSS Selectors," http://www.webreference.com/html/tutorial5/4.html, Aug. 20, 1998, 3 pgs.
"The Technology in Document and Check Security," http://www.securedoc.in/thetechnology.htm, 7 pages (Date Printed Apr. 21, 2008).
"What's Hot in Internet Services?" http://www.webreference.com/html/tutorial5/3, Aug. 20, 1998, 3 pgs.

"Managing the Code Editor and View" Microsoft Corporation, http://msdn.microsoft.com/en-us/library/z01zks9a(VS.71).aspx, 2008.
"Omni Web Help," Omni Group, 2004, http://www.omnigroup.com/documentation/omniweb/browser/tabs.html, 2 pages.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
"To-do List - effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
Agarwal, Vikash K., "Creating a Visually Arresting User-Interface: A3D Tab Control Example," Jan. 4, 2008, http://microsoft.apress.com/asptodayarchive/71723/creating-a-visually-arresting-user-interface-a-3d-tabcontrol-example, 12 pages.
Ando, R. et al., "Visualization-enabled multi-document summarization by Iterative Residual Rescaling," Natural Language Engineering, vol. 11, No. 1, pp. 67-86 (Mar. 2005) (2 page Abstract).
Australian Search Report cited in Singapore Application No. 200504474-8 dated Jan. 16, 2007.
Australian Search Report cited in Singapore Application No. 200505257-6 dated Feb. 12, 2007.
Becker et al., "Virtual Folders: Database Support for Electronic Messages Classification," Pontificia Universidade Catolica do Rio Grande do Sul, Porto Alegre, Brazil, pp. 163-170.
Berliner E.M. et al., "Microsoft Office 2003", Feb. 24, 2004, pp. 39-40, 120-124, 175-177, 233-234 [D1].
Berliner E.M. et al., "Microsoft Office 2003", Feb. 24, 2004, pp. 173-178 [D2].
Bill Dyszel, Microsoft Outlook 2000 for Windows for Dummies, Copyright 1999, pp. 82-86, 102-103, 141,143.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Bos, B, "Re: A proposal for addition to HTML 3.0: Frames," http://www.nyct.net/~aray/htmlwg/95q3/1141.html, 5 pages (Sep. 21, 1995).
Budinsky et al., "WebSphere Studio Overview," http://researchweb.watson.ibm.com/journal/sj/432/budinsky.html, May 6, 2004, 25 pgs.
Camarda, Using Microsoft Word 97, copyright 1997, QUE Corporation, pp. 412, 869.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Chilean Office Action dated Mar. 28, 2008 cited in Appln No. 1770-05, no English Translation (60001.0410CLU1).
Chilean Office Action dated Nov. 27, 2008 cited in Appln No. 1768-2005 (60001.0408CLU1).
Chilean Office Action dated Nov. 27, 2008 cited in Appln No. 1769-2005 (60001.0411CLU1).
Chilean Office Action dated Sep. 23, 2008 cited in Appln No. 1770-2005 (60001.0410CLU1).
Chilean Second Office Action dated Dec. 4, 2009 cited in Appln No. 1768-2005 (60001.0408CL01).
Chilean Second Office Action dated Jan. 29, 2010 cited in Appln No. 1769-2005 (60001.0411CLU1).
Chilean Second Office Action dated Mar. 4, 2009 cited in Appln No. 2512-2005 (60001.0417CL01).
Chilean Second Office Action dated Nov. 4, 2009 cited in Appln No. 1770-2005 (60001.0410CLU1).
Chinese First Office Action dated Apr. 11, 2008 cited in Appln No. 200510092141.1 (60001.0409CCU1).
Chinese First Office Action dated Apr. 18, 2008 cited in Appln No. 200510092142.6 (60001.0410CCU1).
Chinese First Office Action dated Mar. 21, 2008 cited in Appln No. 200510092146.4 (60001.0408CCU1).
Chinese First Office Action dated Mar. 21, 2008 cited in Appln No. 200510092139.4 (60001.0411CCU1).
Chinese First Office Action dated May 23, 2008 cited in Appln No. 200510089514.X (60001.0417CC01).

Chinese Office Action dated Apr. 3, 2009 cited in Appln No. 200510089514.X (60001.0417CC01).
Chinese Office Action dated Jul. 3, 2009 cited in Appln. No. 200680018095.3 (14917.0091CCWO).
Chinese Office Action dated Oct. 16, 2009 cited in Appln No. 200510092142.6 (60001.0410CC01).
Chinese Second Office Action dated Nov. 21, 2008 cited in Appln No. 200510089514.X (60001.0417CC01).
Chinese Second Office Action dated Oct. 10, 2008 cited in Appln No. 200510092141.1 (60001.0409CCU1).
Chinese Second Office Action dated Oct. 17, 2008 cited in Appln No. 200510092139.4 (60001.0411CCU1).
Chinese Third Office Action dated Jun. 19, 2009 cited in Appln No. 200510092139.4 (60001.0411CCU1).
de Candussio, N., "Common GUI Features Report," Herschel CSDT Meeeting, pp. 1-21 (Sep. 2007).
European Communication dated Oct. 20, 2005 cited in EP Application No. 04102463.0-2211 PCT/.
European Communication dated Sep. 14, 2009 cited in Appln. No. 07795391.7-1225 (14917.0376EPWO).
European Communication dated Sep. 28, 2009 cited in Appln No. 09006972.5-2211 (60001.0245EPD1).
European Search Report dated Sep. 7, 2009 cited in EP Application No. 09006972.5-2211 (60001.0245EPD1).
European Summons to Attend Oral Proceedings dated Jun. 23, 2008 cited in Appln No. 04102463.9 (60001.0245EP01).
FrontPage 11 Beta Layperson's Specification, Copyright 2002, Microsoft Corporation, 12 pages.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Goldberg et al., "Using Collaborative Filtering to Weave an Information Tapestry," Communication of the ACM, vol. 35, No. 12, pp. 61-70, Dec. 1992.
Gordon Padwick, Using Microsoft Outlook 2000, Que, Sp. Ed., May 1999, 5 pp. (0257USU1).
Habraken, Microsoft Office XP 8 in 1, published Jun. 05, 2001, http://proquest.safaribooksonline.com/0789725096/, 12 pp.
Hepfner, Troy, "New SOCET CXP Interface Improves Usability," Sep. 2008, http://www.socetset.com/gxpmosaic/?p=95, 4 pages.
http://www.webreference.com/html/tutorial5/5.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
International Search Report dated Nov. 27, 2007 in PCT/US2007/012573, 9 pages.
International Search Report dated Oct. 17, 2007 cited in International Application No. PCT/US2006/012724.
Israeli Office Action dated Oct. 12, 2009 cited in Appln No. 170668 (60001.0417IL01).
Israeli Office Action dated Sep. 6, 2009 cited in Appln No. 169716 (60001.0408ILU1).
Israeli Office Action dated Sep. 7, 2009 cited in Appln No. 169718 (60001.0411ILU1).
Jane Dorothy Calabria Burke, Ten Minute Guide to Lotus Notes 4.6, Publication date: Dec. 23, 1997, 2 pgs.
Khare et al., "The Origin of (Document) Species," University of California, 1998, 9 pgs.
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Lisa K. Averett; Joshua R. Knisley; Mark A. Marvin; Haiti: Projecting Tactical Network and Systems Management; 1995 IEEE pp. 906-910.
Liu et al., "Continual Queries for Internet Scale Event-Driven Information Delivery," IEEE Transactions on Knowledge and Data Engineering, vol. 11, Issue 1, pp. 610-628, 1999.
M. Williams, "Programming Windows NT4: Unleashed," Sams Publishing, Indianapolis, 1996, pp. index & 167-185.
Marsh, Bruce, Integrating Spreadsheet Templates and Data Analysis Into Fluid Power Instruction, Journal of Industrial Technology, vol. 16, No. 4, Aug. 2000 - Oct. 2000. http://www.nait.org/jit/Articles/marsh071200.pdf, 7 pages.
Marshall School of Business, Workshop 1 - Introduction to Outlook & E-mail, Apr. 6, 2000, pp. 1-11.
Marshall School of Business: "Workshop IV - Calendar," http://www.marshall.usc.edu/computing/PDF_Files/Outlook/Workshop4, PDF, Apr. 10, 2000, pp. 1-4.
Mexican Office Action dated Feb. 5, 2009 cited in Appln No. PA/a/2005/008349 (60001.0410MX01).
Mexican Office Action dated Jun. 19, 2009 cited in Appln. No. PA/a/2005/007073 (60001.0417MX01).
Mexican Office Action dated Mar. 3, 2009 cited in Appln No. PA/a/2005/008351 (60001.0408MXU1) English language only.
Microsoft Office 11 Beta Layperson's Specification, Copyright 2002, Microsoft Corporation, 28 pages.
Microsoft Office 2003, Microsoft Office Professional Edition 2003, Microsoft Corporation, 10 pages.
Microsoft Office Word 2003, Part of Microsoft Office Professional Edition 2003, 1983-2003 Microsoft Corporation, 5 pp.
Microsoft Office Word 2003, Part of Microsoft Office Professional Edition 2003, 1983-2003 Microsoft Corporation, screen shot 1, 1 pp.
Microsoft Publisher 11 Beta Layperson's Specification, Copyright 2002, Microsoft Corporation, 13 pages.
Microsoft Windows XP Professional, Version 2002, Service pack 2, 3 pgs.
Microsoft XDocs Beta Layperson Specification, Copyright 2002, Microsoft Corporation, 3 pages.
Nielsen, Jacob. "Tabs, Used Right," Alertbox, Sep. 17, 2007, http://www.useit.com/alertbox/tabs.html, 6 pages.
Office 11 Beta Letter, Copyright 2002, Microsoft Corporation, 6 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
PCT Search Report and Written Opinion dated Dec. 29, 2009 cited in International Application No. PCT/US2009/046344.
PCT Search Report and Written Opinion dated Nov. 30, 2009 cited in International Application No. PCT/US2009/046341.
PCT Search Report dated Feb. 26, 2007 cited in International Application No. PCT/US2006/034993.
Perronne et al. "Building Java Enterprise Systems with J2EE", Publisher: Sams, Pub Date: Jun. 7, 2000 (pp. 1-8).
Philippines Examiner's Action dated Apr. 21, 2008 cited in Appln No. 1-2005-000405 (60001.0410PHU1).
Philippines Examiner's Action dated Apr. 21, 2008 cited in Appln No. 1-2005-000406 (60001.0411PHU1).
Philippines Examiner's Action dated Aug. 19, 2008 cited in Appln No. 12005000405 (60001.0410PHU1).
Philippines Examiner's Action dated Jul. 31, 2008 cited in Appln No. 12005000495 (60001.0417PH01).
Philippines Examiner's Action dated Sep. 12, 2008 cited in Appln No. 1200500406 (60001.0411PHU1).
Raman, "Cascaded Speech Style Sheets," 1997, 7 pgs.
Rice, F, "Customizing the 2007 Office System Document Inspector," http://msdn2.microsoft.com/en-us/library/aa338203(d=printer).aspx, 10 pages (May 2006).
Russian Office Action dated Jul. 21, 2009 cited in Appln No. 2005125837/09(029011) (60001.0410RU01).
Russian Office Action dated Jul. 30, 2009 cited in Appln No. 2005125831/09(029005) (60001.0409RUU1).
Russian Office Action dated Jun. 24, 2009 cited in Appln No. 2005120363/28(023023) (60001.0417RU01).
Russian Office Action dated Oct. 26, 2009 cited in Appln No. 2005120363/09(023023) (60001.0417RU01).
Russian Office Action dated Sep. 10, 2009 cited in Appln No. 2005125836/09(029010) (60001.0411RUU1).
Russian Office Action dated Sep. 10, 2009 cited in Appln No. 2005125839/09(029013) (60001.0408RU01).
Schumaker, "User Interface Standards," http://msdn2.microsoft.com/en-us/library/aa217660(office.11.d=printer).aspx, Sep. 2001, 5 pgs.

Screen Dumps Microsoft Corporation, Microsoft Office Professional Edition 2003, 4 pp.
Screen Dumps Microsoft Corporation, Microsoft Office Professional Edition 2003, 5 pp.
Screen Dumps of Microsoft Outlook (1999, pp. 1-3).
Screendumps - Microsoft Office Outlook, Microsoft Office Outlook Professional Edition 2003, Microsoft Corporation, 2 pages.
Screendumps - Microsoft Office, Microsoft Corporation, Microsoft Office Professional Edition 2003, 13 pages.
Screendumps - Microsoft Office, Microsoft Office Professional Edition 2003, Microsoft Corporation, 10 pages.
Screendumps - Microsoft Office (Microsoft Corporation, Microsoft Office Professional Edition 2003; 16 pages).
Supplementary European Search Report dated May 28, 2009 cited in EP Application No. 07795391.7-1225.
U.S. Final Official Action dated Jan. 23, 2007 in U.S. Appl. No. 10/741,407 (0253USU1).
U.S. Final Official Action dated Jan. 28, 2008 cited in U.S. Appl. No. 10/836,154 (60001.0254USU1).
U.S. Final Official Action dated Oct. 19, 2006 in U.S. Appl. No. 10/800,056 (50037.0218US01).
U.S. Official Action dated Apr. 12, 2007 cited in U.S. Appl. No. 10/851,506 (0257USU1).
U.S. Official Action dated Apr. 15, 2008 cited in U.S. Appl. No. 10/955,942 (60001.0411USU1).
U.S. Official Action dated Apr. 16, 2008 cited in U.S. Appl. No. 10/955,967 (60001.0410USU1).
U.S. Official Action dated Apr. 27, 2006 in U.S. Appl. No. 10/800,056 (50037.0218US01).
U.S. Official Action dated Apr. 28, 2009 in U.S. Appl. No. 12/028,797 (60001.0245USC1).
U.S. Official Action dated Apr. 29, 2008 cited in U.S. Appl. No. 10/955,941 (60001.0408USU1).
U.S. Official Action dated Apr. 7, 2009 in U.S. Appl. No. 10/955,940 (60001.0409USU1).
U.S. Official Action dated Aug. 18, 2009 in U.S. Appl. No. 11/782,059 (60001.0253USC1).
U.S. Official Action dated Aug. 4, 2009 in U.S. Appl. No. 10/955,942 (60001.0411USU1).
U.S. Official Action dated Aug. 4, 2009 in U.S. Appl. No. 10/955,967 (60001.0410USU1).
U.S. Official Action dated Dec. 10, 2009 in U.S. Appl. No. 10/955,940 (60001.0409USU1).
U.S. Official Action dated Dec. 21, 2007 in U.S. Appl. No. 10/851,506 (60001.0257USU1).
U.S. Official Action dated Dec. 23, 2003 in U.S. Appl. No. 09/896,384 (0048US01).
U.S. Official Action dated Dec. 23, 2008 in U.S. Appl. No. 10/955,942 (60001.0411USU1).
U.S. Official Action dated Dec. 24, 2008 in U.S. Appl. No. 10/955,967 (60001.0410USU1).
U.S. Official Action dated Dec. 28, 2007 in U.S. Appl. No. 10/800,056 (50037.0218US01).
U.S. Official Action dated Dec. 4, 2007 in U.S. Appl. No. 10/955,940 (60001.0409USU1).
U.S. Official Action dated Dec. 8, 2009 in U.S. Appl. No. 11/151,686.
U.S. Official Action dated Dec. 9, 2009 in U.S. Appl. No. 12/028,797 (60001.0245USC1).
U.S. Official Action dated Feb. 18, 2010 in U.S. Appl. No. 11/782,059 (60001.0253USC1).
U.S. Official Action dated Feb. 19, 2010 in U.S. Appl. No. 10/955,942 (60001.0411USU1).
U.S. Official Action dated Feb. 20, 2008 cited in U.S. Appl. No. 10/848,774 (60001.0255USU1).
U.S. Official Action dated Feb. 21, 2008 cited in U.S. Appl. No. 10/851,442 (60001.0256USU1).
U.S. Official Action dated Feb. 22, 2008 in U.S. Appl. No. 11/445,393.
U.S. Official Action dated Jan. 20 2010 in U.S. Appl. No. 10/955,967 (60001.0410USU1).
U.S. Official Action dated Jan. 25, 2010 in U.S. Appl. No. 10/982,073 (60001.0048USC1).
U.S. Official Action dated Jan. 4, 2007 in U.S. Appl. No. 10/607,020 (0245US01).
U.S. Official Action dated Jan. 6, 2009 in U.S. Appl. No. 10/955,941 (60001.0408USU1).
U.S. Official Action dated Jan. 6, 2010 in U.S. Appl. No. 10/607,020 (60001.0245US01).
U.S. Official Action dated Jan. 7, 2010 in U.S. Appl. No. 11/430,562.
U.S. Official Action dated Jan. 8, 2008 cited in U.S. Appl. No. 10/955,928 (60001.0417US01).
U.S. Official Action dated Jul. 11, 2007 in U.S. Appl. No. 10/955,941 (0408USU1).
U.S. Official Action dated Jul. 11, 2007 in U.S. Appl. No. 10/955,942 (0411USU1).
U.S. Official Action dated Jul. 11, 2007 in U.S. Appl. No. 10/955,967 (0410USU1).
U.S. Official Action dated Jul. 13, 2007 in U.S. Appl. No. 10/800,056 (50037.0218US01).
U.S. Official Action dated Jul. 17, 2008 cited in U.S. Appl. No. 10/955,940 (60001.0409USU1).
U.S. Official Action dated Jul. 24, 2008 cited in U.S. Appl. No. 11/151,686.
U.S. Official Action dated Jul. 26, 2006 in U.S. Appl. No. 10/741,407 (0253USU1).
U.S. Official Action dated Jun. 1, 2009, U.S. Appl. No. 11/445,393.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 14, 2007 in U.S. Appl. No. 10/836,154 (0254USU1).
U.S. Official Action dated Jun. 19, 2008 in U.S. Appl. No. 10/851,506 (60001.0257USU1).
U.S. Official Action dated Jun. 20, 2008 in U.S. Appl. No. 10/955,928 (0417US01).
U.S. Official Action dated Jun. 21, 2007 in U.S. Appl. No. 10/955,928 (0417US01).
U.S. Official Action dated Jun. 24, 2009 in U.S. Appl. No. 10/607,020 (60001.0245US01).
U.S. Official Action dated Jun. 4, 2007 in U.S. Appl. No. 10/955,940 (0409USU1).
U.S. Official Action dated Jun. 8, 2009 in U.S. Appl. No. 10/982,073 (60001.0048USC1).
U.S. Official Action dated Mar. 18, 2009 in U.S. Appl. No. 11/401,470.
U.S. Official Action dated May 28, 2008 cited in U.S. Appl. No. 10/982,073 (60001.0048USC1).
U.S. Official Action dated Nov. 13, 2008 in U.S. Appl. No. 11/430,562.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Nov. 25, 2008 cited in U.S. Appl. No. 11/154,278.
U.S. Official Action dated Oct. 28, 2008 cited in U.S. Appl. No. 11/151,686.
U.S. Official Action dated Oct. 9, 2007 in U.S. Appl. No. 10/982,073 (60001.0048USC1).
U.S. Official Action dated Sep. 23, 2009 in U.S. Appl. No. 11/401,470.
U.S. Official Action dated Sep. 26, 2007 in U.S. Appl. No. 11/151,686.
U.S. Official Action mailed dated Oct. 8, 2008 cited in U.S. Appl. No. 11/445,393.
U.S. Official Action mailed Dec. 11, 2008 in U.S. Appl. No. 10/982,073 (60001.0048USC1).
U.S. Appl. No. 09/896,384 filed Jun. 29, 2001 entitled "Gallery User Interface Controls," (60001.0245US01 - Copy of Application Unavailable), now U.S Appl. No. 6,826,729.
U.S. Appl. No. 10/607,020 filed Jun. 26, 2003 entitled "Side-by-Side Shared Controls," (60001.0245US01).

U.S. Appl. No. 10/741,407 filed Dec. 19, 2003 entitled "Methods, Systems, and Computer-Readable Mediums for Providing Persisting and Continuously Updating Search Folders" (60001.0253USU1), now U.S. Appl. No. 7,392,249.

U.S. Appl. No. 10/800,056 filed Mar. 12, 2004 entitled "Method and System for Data Binding in a Block Structured User Interface Scripting Language" (50037.0218US01 T. Sullivan/Tracy G.).

U.S. Appl. No. 10/836,154 filed Apr. 30, 2004 entitled "Combined Content Selection and Display User Interface" (60001.0254USU1).

U.S. Appl. No. 10/848,774 filed May 19, 2004 entitled "Automatic Grouping of Electronic Mail" (60001.0255USU1).

U.S. Appl. No. 10/851,506 filed May 21, 2004 entitled "Adaptive Multi-Line View User Interface" (60001.0257USU1).

U.S. Appl. No. 10/955,928 filed Sep. 30, 2004 entitled "User Interface for Providing Task Management and Calendar Information" (60001.0417US01).

U.S. Appl. No. 10/955,940 filed Sep. 30, 2004 entitled "An Improved User for Displaying Selectable Software Functionality Controls that are Contextually Relevant to a Selected Object" (60001.0409USU1).

U.S. Appl. No. 10/955,941 filed Sep. 30, 2004 entitled "An Improved User Interface for Displaying Selectable Software Functionality Controls that are Relevant to a Selected Object" (60001.0408USU1).

U.S. Appl. No. 10/955,942 filed Sep. 30, 2004 entitled "An Improved User Interface for Displaying a Gallery of Formatting Options Applicable to a Selected Object" (60001.0411USU1).

U.S. Appl. No. 10/955,967 filed Sep. 30, 2004 entitled "Command User Interface for Displaying Selectable Software Functionality Controls," (60001.0410USU1).

U.S. Appl. No. 10/982,073 filed Nov. 5, 2004 entitled "Gallery User Interface Controls" (60001.0048USC1).

U.S. Appl. No. 11/151,686 filed Jun. 13, 2005 entitled "Floating Command Object".

U.S. Appl. No. 11/154,278 filed Jun. 16, 2005 entitled "Cross Version and Cross Product User Interface Compatibility".

U.S. Appl. No. 12/372,386 filed Feb. 17, 2009 entitled "Command User Interface for Displaying Multiple Sections of Software Functionality Controls" (60001.0410USI1 CLeonard.).

U.S. Appl. No. 11/401,470 filed Apr. 10, 2006 entitled "Command User interface for Displaying Selectable Functionality Controls in a Database Application".

U.S. Appl. No. 11/430,416 filed May 9, 2006 entitled "Search and Find Using Expanded Search Scope".

U.S. Appl. No. 11/430,562 filed May 9, 2006 entitled "Expanded Search and Find User Interface".

U.S. Appl. No. 11/823,999 filed Jun. 29, 2007 entitled "Accessing an Out-Space User Interface for a Document Editor Program".

U.S. Appl. No. 12/163,758 filed Jun. 27, 2008 entitled "Communication Between a Document Editor-in-Space User Interface and a Document Editor Out-Space User Interface".

U.S. Appl. No. 12/163,784 filed Jun. 27, 2008 entitled "Exposing Non-Authoring Features Through Document Status Information in an Out-Space User Interface".

U.S. Appl. No. 12/574,256 filed Oct. 6, 2009 entitled "Modifying a Chart".

Word 2002, Chapter 14; Paradigm Publishing Inc., copyright 2002; http://www.emcp.com/tech_tutorials/sig_irc/Signature_Word_Chapter_14.ppt, 21 pp.

* cited by examiner

| Mail 910 | Calendar 920 | Contacts 930 |
|---|---|---|
| Favorite Folders<br>🔲 Unread Mail (3)<br>📄 For Follow Up<br>📁 Sent Items<br>All Mail Folders<br>🔍 All Mail Items<br>└ 😊 Mike Pell<br>　　🗑 Deleted Items (20)<br>　　📄 Drafts | Calendars<br>🔍 All Calendars<br>　☑ My Calendar<br>　☐ Office 12 Outlook - Events<br>　☐ Outlook Design and Usability - UI St<br>Current View<br>　⦿ Day/Week/Month<br>　○ Day/Week/Month View With AutoPr | My Contacts<br>🔍 All Contacts<br>　📇 Contacts<br>　📇 Personal Contacts<br>Current View<br>　⦿ Address Cards<br>　○ Detailed Address Cards<br>　○ Phone List |

| Tasks 940 | Notes 950 | Journal 960 |
|---|---|---|
| My Tasks<br>🔍 All Tasks<br>　📝 Tasks (1)<br>　📝 Completed Tasks<br>　📝 Old Tasks<br>Current View<br>　○ Simple List<br>　○ Detailed List | My Notes<br>🔍 All Notes<br>　📒 Notes<br>Current View<br>　⦿ Icons<br>　○ Notes List<br>　○ Last Seven Days<br>　○ By Category | My Journals<br>🔍 All Journals<br>　📘 Journal<br>Current View<br>　⦿ By Type<br>　○ By Contact<br>　○ By Category<br>　○ Entry List |

*Fig. 9*

INTEGRATED SEARCH AND FIND USER INTERFACE

CROSS-REFERENCE TO RELATED APPLICATIONS

This patent application claims priority to U.S. Patent Application Ser. No. 60/716,267 filed Sep. 12, 2005 and entitled "Integrated Search User Experience Utilizing Tri-Pane/Minibar Design," U.S. Patent Application Ser. No. 60/716,358 filed Sep. 12, 2005 and entitled "Advanced Searching—Use of Recall Landmarks in Expanded Find User Experience—Expanding Find Pane," and U.S. Patent Application Ser. No. 60/716,236 filed Sep. 12, 2005 and entitled "Upscoping Searches," the disclosures of which are expressly incorporated herein, in their entirety, by reference.

This patent application is also related to and filed concurrently with U.S. patent application Ser. No. 11/430,562, entitled "Expanded Search and Find User Interface,"; and U.S. patent application Ser. No. 11/430,416, entitled "Search and Find Using Expanded Search Scope," which are assigned to the same assignee as the present application and expressly incorporated herein, in their entirety, by reference.

BACKGROUND

With the advent of the computer age, computer software users have grown accustomed to user-friendly software applications that help them write, calculate, organize, prepare presentations, send and receive electronic mail, make music, and the like. Electronic mail applications allow users to send and receive electronic mail to and from other users. Electronic mail applications also allow users to store sent or received mail in a variety of user-established storage folders. Electronic calendar applications allow users to maintain a variety of calendar information, such as appointments, in an electronic medium. Contacts applications allow users to maintain, sort and access contact information, such as names, addresses, telephone numbers, electronic mail addresses, and the like for a variety of persons or entities. Other applications, for example, tasks applications, notes applications and journal applications allow users to create, maintain and store a variety of electronic data, such as tasks, notes, journal entries, etc. Multiple functionality applications have been developed with which a variety of software modules, for example, electronic mail, calendar, contacts, tasks, notes, journals, etc. may be available through a single software application that allows users to switch between the different software modules upon demand.

With such software applications, users typically store large amounts of data in various storage locations associated with each application or associated with different software modules of a multiple functionality application. For example, users often store received electronic mail items, sent electronic mail items and even deleted electronic mail items in one or more storage folders associated with an electronic mail application. Users store calendar information, such as appointments, in personal calendars, business calendars, social calendars and the like. A variety of contacts information may be stored, such as names, addresses, telephone numbers, electronic mail addresses, etc. Other information stored by users with such applications includes notes, tasks, journal items, and the like stored in one or more storage locations.

Search and find mechanisms have been developed for locating a particular stored data item or a number of stored data items associated with a particular search attribute or property (for example, a mail item, contact item, calendar item, etc.) But, existing search and find mechanisms typically search across entire data storage areas (for example, all received electronic mail) and do not offer the opportunity for search of sub-storage areas making up larger storage areas. Thus, such searches tend to be slow and often return large amounts of data that are not particularly relevant to the search. If such a search is executed and no acceptable result is returned, users are often required to conduct expanded or advanced searches. However, average users who do not use such search and find functionality frequently often do not possess the required skills or patience to conduct more advanced searching for one or more needed data items. In addition, often a user conducts a search in a particular storage area, for example, a received mail folder, only to be frustrated when the desired item is not located. In many cases, the desired item is stored, but is not stored in the storage location searched by the user, and the user lacks a means for efficiently changing the scope of the search to include other storage locations.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention solve the above and other problems by providing an improved search and find function that integrates a data indexing engine for efficient and high speed data search and retrieval. A simplified search and find user interface is provided that is displayed in close proximity to selectable data storage folders and to other user interface components of a given software module, for example, an electronic mail software module. The search and find user interface may be used for searching data stored in a particular storage folder associated with a given software module (for example, a sent mail folder associated with an electronic mail module). According to an embodiment, if advanced search is desired, an expanded form of the search and find user interface is provided to allow tailored searching based on attributes associated with a desired data item, such as date received, date sent, presence of attachments, presence of flags or links, and the like.

If a broader search is desired, a given search may be automatically "upscoped" so that a given search request is applied to a broader scope of data (for example, all electronic mail folders associated with an electronic mail module). In the case of multiple-functionality software applications with multiple software modules, for example, electronic mail, electronic calendaring, contacts, tasks, notes, journals, and the like, both the simplified and the expanded search and find user interfaces and associated functionalities may be utilized across disparate software modules for search and retrieval of data associated with different modules.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIG. 9 illustrates computer screen displays showing lists of storage folders associated with a number of software modules.

DETAILED DESCRIPTION

As briefly described above, embodiments of the present invention are directed to a search and find user interface that is integrated with a data indexing engine to allow efficient and high-speed data search and retrieval across data storage folders associated with a given software module or associated with a number of disparate software modules. An expanded form of the search and find user interface is provided for advanced searching, and where searching is required beyond a present search scope, an automatic upscoping mechanism is provided for expanding a search to data storage folders outside a current data storage folder on which an initial search is executed. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
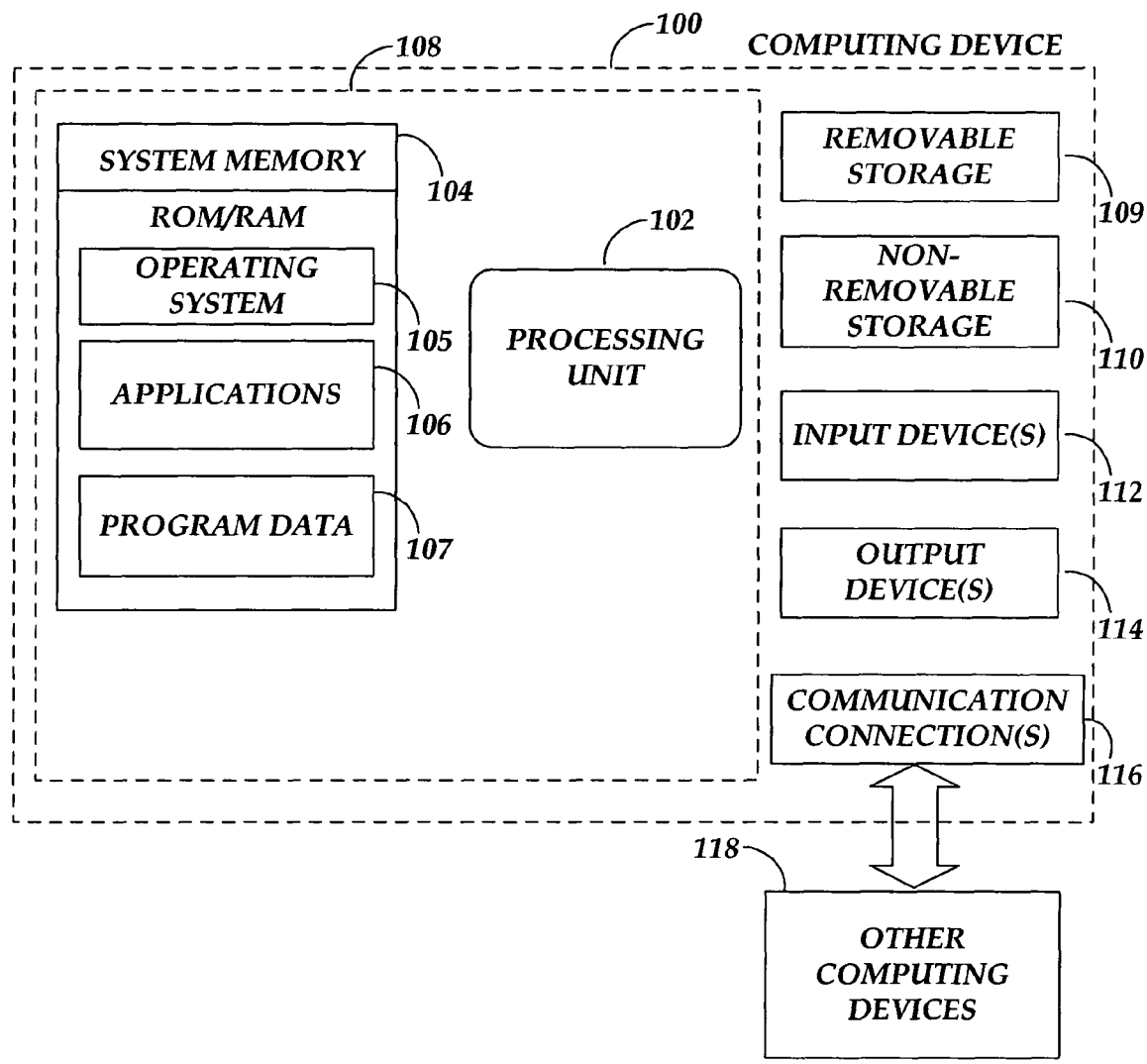
FIG. 1 illustrates an exemplary computing operating environment.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT Corporation of Redmond, Wash. The system memory 104 may also include one or more software applications 106, and may include program data 107. This basic configuration is illustrated in FIG. 1 by those components within dashed line 108.

In one embodiment, the application 106 may comprise many types of programs, such as a word processing application program, a spreadsheet application, a desktop publishing, and the like. According to an embodiment of the present invention, the application program 106 comprises a multiple-functionality software application for providing a user calendaring functionality, electronic mail functionality, contacts information functionality, electronic notes functionality, electronic journal functionality and the like. Some of the individual program modules comprising such a multiple-functionality program 106 include a calendar module, an electronic mail program, a contacts module, a tasks module, a notes module and a journal module (not shown). An example of such a multiple-functionality program 106 is OUTLOOK® manufactured by Microsoft Corporation.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
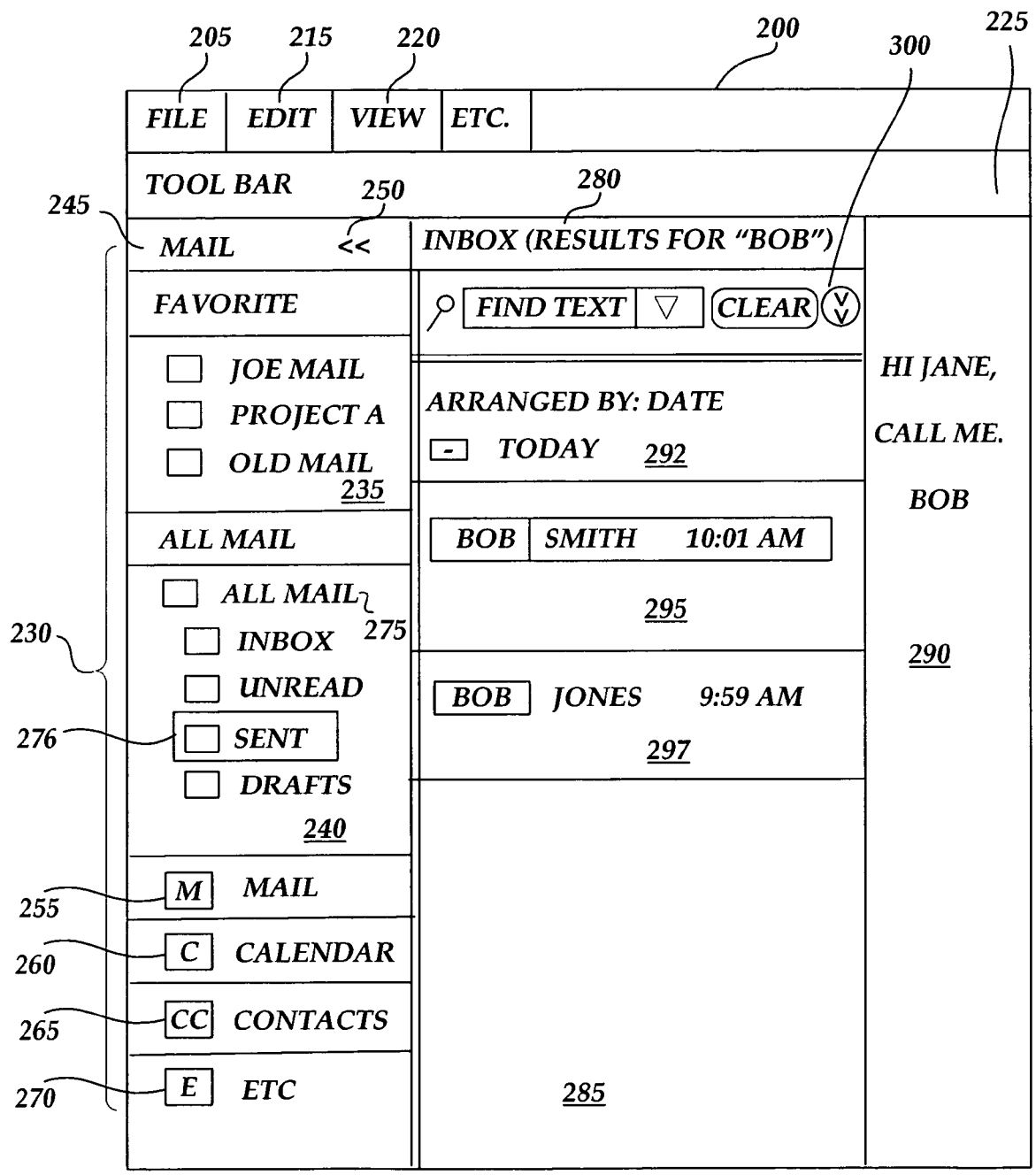
FIG. 2 illustrates a computer screen display of an electronic mail application user interface showing an integrated search and find pane.

FIG. 2 illustrates a computer screen display of an electronic mail application user interface showing a navigation pane, a mail list pane and a preview pane. The user interface 200 is representative of an electronic mail application user interface in which a variety of electronic mail items may be displayed to a user. As should be understood by those skilled in the art, the user interface 200 illustrated in FIG. 2 along with the example content illustrated in the user interface 200 is for purposes of example only and is not limiting or restrictive of the vast amount of different types of electronic mail content and functionality that may be provided in an electronic mail application user interface. Referring then to FIG. 2, the user interface 200 illustrated in FIG. 2 includes a variety of functionality buttons including a file button 205, an edit button 215, a view button 220, and a tool bar 225 in which may be displayed a variety of selectable functionality controls (not shown) for selecting functionality for operating on data displayed in the user interface 200.

Along the right-hand side of the user interface 200 is a preview pane 290. In the preview pane 290, the contents of a selected or given electronic mail message may be displayed to allow a user to quickly review a portion or all of the contents of a given electronic mail message. A mailbox list pane 285 is displayed in the middle of the user interface 200. The mailbox list pane 285 may be in the form of an inbox, sent mailbox, unread mailbox, particular mail folder mailbox, and the like. The list pane 285 includes a listing of received or sent electronic mail items associated with a given mail data type (e.g., received, sent, unread, folder, etc.). As should be understood by those skilled in the art, the list pane 285 may be selectively replaced with an inbox pane, outbox pane, a sent mail items pane, an unread mail pane, or a variety of other panes associated with different types of mail items that may be reviewed via the user interface 200. According to embodiments of the present invention, the content provided in the preview pane 290 is keyed to electronic mail items listed in the list pane 285.

Along the left-hand side of the user interface 200 is a navigation pane 230. The navigation pane 230 may include selectable items associated with various types of data that may be displayed and/or edited via the user interface 200. For example, a favorite folders section 235 includes an example personal mail folder (e.g., "Joe Mail"), a business mail folder (e.g., "Project A" mail) and a miscellaneous folder (e.g., "Old Mail"). Selection of one of these folders causes a display of the associated panes 285 and 290, as described above. For example, selection of the "Project A" folder causes an inbox mail list pane 285 and an associated electronic mail preview pane 290 to be displayed, where a list of mail items from the "Project A" folder are displayed in the list pane 285 and where a preview of a selected mail item is displayed in the preview pane 290.

An additional section 240 contained in the navigation pane 230 includes various data folders associated with the currently in-use software module, for example, an electronic mail module. An "All Mail" folder 275 includes all mail items stored in association with the in-use mail module. The "All Mail" folder serves as a parent folder to a number of sub-folders or child folders that contain subsets of the data items contained in the overall "All Mail" folder. For example, an "Inbox" folder contains received email items. An "Unread" folder may contain email items that have not been read. A "Sent" folder may contain sent mail items.

At the lower end of the navigation pane 230 is a software application module selection area. The software module selection area includes selectable controls associated with different software applications that may be selected for launching associated applications and associated user interfaces 200. For example, selection of the mail control 255 causes the launching of an associated electronic mail application and the display of an electronic mail application user interface 200, as illustrated in FIG. 2. Similarly, selection of the calendar control 260 causes the launching of an electronic calendar application and causes the display of an associated calendar application user interface 200. Selection of a contacts control 265 causes the launching of a contacts application and causes the launching of an associated contacts application user interface 200 (not shown). As should be understood by those skilled in the art, the number and types of software application modules illustrated in FIG. 2 are for purposes of example only and are not limiting of other types of software application modules that may be provide, such as a tasks module, a journal module, a notes module, and the like. Also, as should be understood, the icons illustrated in FIG. 2 for the selectable controls 255, 260, 265, 270 are for purposes of example only and are not limiting of the variety of different types of visual icons that may be used for identifying different software applications.

Selection of other software modules as described herein not only causes the launching of an associated software application and the display of an associated user interface 200, but also populates the navigation pane 230 with selectable controls associated with data storage folders for the selected software module. For example, if a calendar module is selected, then the navigation pane 230 may be populated with one or more selectable controls associated with one or more calendar storage folders, for example, a storage folder for a business calendar, a storage folder for a personal calendar, a storage folder for a social calendar, and the like. Similarly, selection of a contacts software module causes the launching of an associated contacts application and the display of a user interface 200 associated with the contacts application. The navigation pane 230 will likewise be populated with one or more data storage folders associated with the contacts application, for example, a business contacts folder, a personal contacts folder, a project contacts folder, or a variety of other folders desired by the user.

For another example, if a user is currently utilizing a calendar module, and the user is currently viewing calendaring items, for example, appointments, contained in a particular calendar module data storage folder, for example, a business calendar folder, the search and find pane 300 is operative to locate calendar data items, for example, appointments, contained in the business calendar folder. For another example, if the user is currently utilizing a notes module, and the user is currently viewing notes items contained in a "personal notes" storage folder, then the search and find pane 300 of the present invention is operative to locate particular data items in the storage folder in use. As will be described in detail below, the scope of a given search may be automatically expanded or "Upscoped" to search for items contained in a broader storage area, for example, the "All Mail" folder 275, illustrated in FIG. 2.

Integrated Search and Find

According to embodiments, a search and find pane 300 is provided for searching the storage folders associated with the presently deployed software module. For example, if a user is currently viewing electronic mail items contained in the "Inbox" folder, illustrated in section 240, the search and find pane 300 is operative to locate email items contained in that folder. If a user is currently viewing email items in the "Project A" mail folder, illustrated in section 235, the search and find pane 300 is operative to locate email items contained in that folder. As will be described in detail below, the scope of a given search may be automatically expanded or "Upscoped" to search for items contained in a broader storage area, for example the "All Mail" folder. If a different software module is selected, for example, a calendar module, the search and find pane 300 may be used to search data folders associated with a calendar module, such as different stored calendar views. If a contacts module is selected, the search and find pane 300 may be used to search for data contained in different contacts folders, and so on. Example upscoping mechanisms disposed in navigation panes for different software modules are illustrated in FIG. 9 below.

Referring still to FIG. 2, the integrated search and find pane 300 is provided in the user interface 200 above the mailbox list pane 285 between the navigation pane 230 and the preview pane 290. When the search and find pane 300 is utilized, as described herein, to search for a particular data item, for example, an email message from a particular sender, results from the mail search, including all electronic mail items containing a keyword or other search query with which a search is initiated are listed beneath the search and find pane 300 in a results list as illustrated by the electronic mail messages 295 and 297 shown beneath the pane 300 in FIG. 2.

According to embodiments of the present invention, the speed and efficiency of searching via the search and find pane 300 is enhanced through the use of data indexing. According to data indexing, each data storage folder is indexed on a periodic basis to allow subsequent searching via the search and find pane 300 to be operated against an index associated with stored data as opposed to requiring the search and find mechanism to search all data contained in a given storage folder in response to each initiated search. For example, referring to FIG. 2, on a periodic basis, all electronic mail items contained in the "Inbox" storage folder, illustrated in section 240, are periodically indexed according to a variety of terms and data types which may be utilized for efficiently searching and finding particular data items in that folder. For example, terms and/or data types that may be utilized for indexing electronic mail items may include "from", "to", "data", "attachments", "name", and the like. Thus, if a subsequent search is initiated via the search and find pane 300 against an indexed data folder, data items responsive to the search may be found more rapidly. According to embodiments, searches against indexed data folders may be performed in fractions of seconds as opposed to significantly longer periods for non-indexed data storage folders.

For example, if a user searches for all electronic mail items contained in a target folder based on a particular name, then the name supplied by the user may be processed against names indexed for the target storage folder for efficiently returning data items contained in the target storage folder corresponding to the name provided by the user. Likewise, if a user initiates a search of the target storage folder for all electronic mail items received from a named party on a particular date, then the search and find mechanism of the present invention may utilize indexing based on key terms or landmarks such as "from," "name" and "date" for efficiently retrieving data responsive to the initiated search. As should be appreciated, similar indexing is performed for other types of data storage folders associated with other software modules, for example, calendar modules, contacts modules, tasks modules, notes modules, journal modules, and the like. For example, all data contained in a given storage folder for a calendar module may be periodically indexed based on a variety of landmarks or key terms associated with calendar data, for example, appointments, appointment start times, appointment end times, appointment dates, appointment attendees, and the like.

According to embodiments of the present invention, the speed and efficiency of searching and finding desired data items via the search and find pane 300 is also enhanced by applying an initiated search against data contained in a currently in-use data storage folder. For example, if a user is currently reviewing electronic mail contained in the "Sent" mail folder, illustrated in section 240 of the navigation pane 230, a search initiated by the user via the search and find pane 300 is run against only those data items contained in the "Sent" mail folder. By running the initiated search against only those data items contained in the currently in-use data folder, the search is more efficient and more rapid because a limited number of data items must be parsed in response to the search.

In addition, by limiting the initiated search to only those data items contained in the currently in-use data folder, user satisfaction is increased because if the user is currently viewing data items contained in a particular data folder, for example, the "Sent" mail folder, then the user likely expects that an initiated search will be run against only those data items contained in the currently in-use data folder. Thus, not only is speed and efficiency of the search enhanced by limiting the search to data contained in the currently in-use data folder, but user expectations and satisfaction are enhanced by training the user that any search and find operation initiated by the user will be first initiated against the currently in-use data folder and will be subsequently initiated against a broader set of data items only upon user action.

The search and find pane 300 is a simplified user interface containing a minimum number of components for ease of use and for minimization of user interface display space consumption. According to embodiments, the search and find pane 300 is maintained in a visible and easily discoverable location, as illustrated in FIG. 2, and is kept in close proximity to the data folders upon which the search and find pane 300 acts for the user interfaces 200 of all associated software modules. The search and find pane is automatically deployed in the user interfaces 200 for each of the respective software modules. There is no requirement for manually launching the search and find pane 300, and thus, the search and find pane 300 remains constantly visible and discoverable to the end user. Referring still to FIG. 2, the operation flow for use of the search and find pane 300 begins by selecting a particular data folder from the navigation pane 230 which sets the scope of a subsequent search, followed by initiation of a search using the search and find pane 300 which filters data contained in the selected data folder according to a search query, followed by a presentation of results of the search beneath the search and find pane 300, and followed by a presentation of a preview of selected results items in the preview pane 290. Alternatively, the operation flow for use of the search and find pane 300 may begin upon the entry of a search string into the textbox 310 without first setting a particular search scope. That is, according to this embodiment, a search may begin automatically on the present scope (e.g., Sent mail items) when a search string is entered into the textbox 310.

Figure 3:
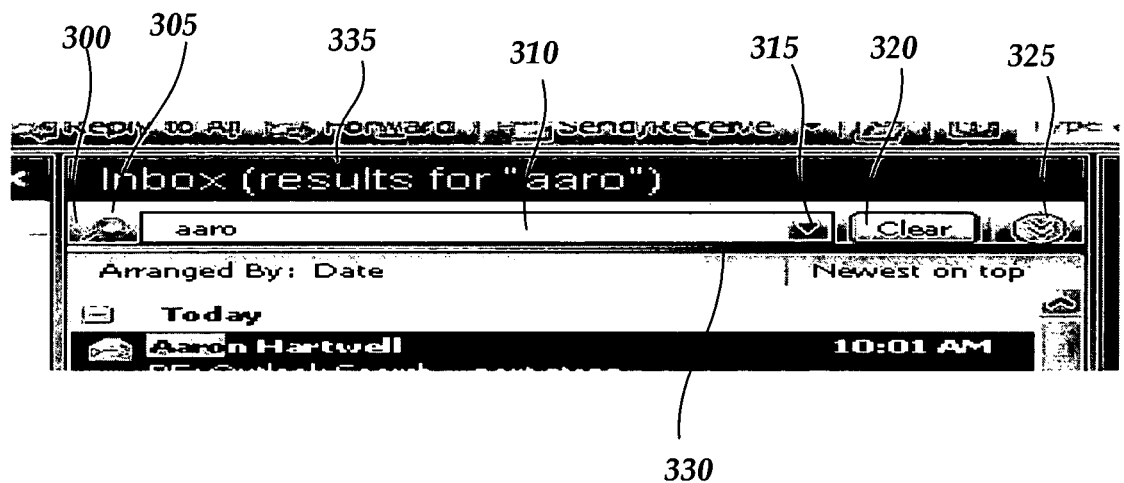
FIG. 3 illustrates a computer screen display of a search and find user interface.

Referring now to FIG. 3, as briefly described above, for better discoverability, the search and find pane 300 is located approximately in the center of the user interface 200 above a data list pane of the current software module in use. By placing the search and find pane 300 in this location, the search and find pane is more visible, more discoverable and more useful to end users. According to one embodiment, the search and find pane 300 may be displayed as wide as the entire width of the current software module's results or data display space, for example, the mail items list pane 285, illustrated in FIG. 2. A background color or shading may be applied to the search and find pane 300 to set it off from surrounding controls and panes contained in the user interface 200 for further enhancing discoverability. According to one embodiment, when the search and find pane 300 is in use, where any control in the search and find pane is selected or when a search is in progress, the background gradient, shading or coloring of the search and find pane 300 may be altered for creating a visual appearance that the search and find pane 300 is in operation. For further enhancing discoverability during an active search initiated via the search and find pane 300, the currently selected data folder, for example, the "Sent" data folder may be highlighted (276) for indicating that an active search is presently in operation against the highlighted data folder.

Referring still to FIG. 3, the search and find pane 300 includes a number of user interface elements. On the left of the pane 300, a magnifying glass icon 305 is displayed for indicating to an end user that the pane 300 is associated with searching and finding desired data items. As should be appreciated, the icon 305 may be displayed in different locations for best use of available display space, for example, the icon may be displayed in the textbox 310, or the icon may be eliminated altogether. The search textbox 310 is provided in which free form alphanumeric (e.g., alphabetic or numeric characters) input, including special characters, may be entered for construction of a search query for processing against the indexed data contained in the currently in-use data folder. For example, whole words, partial words, or combination of words may be entered into the textbox 310 for initiation of a search. For example, text strings such as "sea," "search," "search spec," or "search for specification" may be entered into the textbox 310 to initiate a desired search.

According to one embodiment, a character limit, such as 255 characters, may be imposed on the textbox 310. Such a character limit may be imposed as a security measure to reduce a risk of a user's data being attacked and compromised via the search mechanism. According to one embodiment, a keyboard shortcut, for example, "CRTL+E," may be utilized for automatically placing focus in the textbox 310 for quickly initiating a search using the search and find pane 300.

According to an embodiment, a search context identification string may be displayed in the textbox 310 to alert a user as to the current context of an initiated search if the search scope is not changed. For example, if the user is currently using the "Sent" mail folder, a text string may be displayed in the textbox 310, such as "Now searching the Sent mail folder," to alert the user that an initiated search will be directed at the "Sent" mail folder unless the user changes the scope to some other data folder. For another example, if a user has selectively directed searches to be against all mail items, the identification string may read "Now searching all mail items" or the like. The text string may be colored or shaded in a manner to distinguish it from a search query. When a search query is entered into the textbox 310, the context identification string is replaced.

At the right end of the textbox 310, a most recently used (MRU) drop down list control 315 is provided. Selection of the MRU control 315 causes deployment of a drop down list containing a number of previously used search strings. Selection of one of the most recently used search strings from the drop down list causes automatic insertion of the selected search string into the textbox 310 for initiation of an associated search. As will be described below, an alternative embodiment includes deployment of a dropdown menu upon selection of the control 315 for changing the scope of a given search, including selection of an MRU list.

A search may be initiated after entry of a search string query into the textbox 310 according to a number of methods. According to a first method, a "results as you type" method (also known as "word-wheeling") may be employed. According to this method, as a text string is being entered into the textbox, an automatic search may be initiated against the indexed data of the currently in-use data folder that is dynamically updated as each new character is entered into the text string. For example, if a first character of "B" is entered, a search will be automatically processed against all data items contained in the currently in-use data folder having the character "B." As a next character is appended to the search string, for example, "O", the search is dynamically updated against the currently in-use data folder for data items matching a search string of "BO." If a next character is appended to the search string, for example, "B," the search is dynamically updated to list those items contained in the currently in-use data folder containing the string "BOB". That is, according to the word-wheeling method, the results list of data items responsive to the search is automatically populated and is dynamically updated with each additional alphanumeric character appended to the current search query string being entered into the textbox 310.

Figure 4:
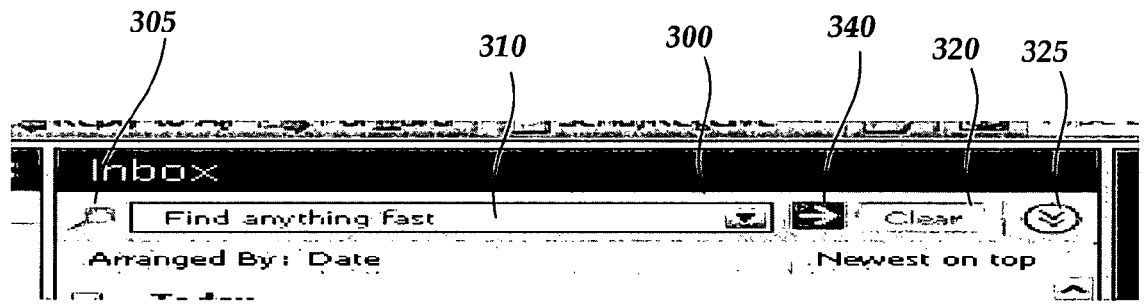
FIG. 4 illustrates a computer screen display of a search and find user interface.

According to a second method, a search is not initiated until a user action following entry of a search string query. According to this method, a search query is entered into the textbox 310, for example, the text string "Bob," followed by a user action such as the selection of a carriage return for initiating a search of the currently in-use data folder with the entered search string. Alternatively, after the entry of a desired search query in the textbox 310, or after the selection of a previously entered search query from the most recently used drop down list, a "Go" button 340 may be populated adjacent to the textbox 310, as illustrated in FIG. 4. Selection of the "Go" button 340 may then initiate a search of the currently in-use data folder based on the search query populated in the textbox 310.

A progress indicator strip 330 is provided for showing a visual indication that a search is in progress. According to one embodiment, an animation, for example, a color or light moving from side to side in the progress indicator strip 330, may be provided during the time of an active search on a target data folder. Upon conclusion of an active search, the animation displayed in the progress indicator strip 330 ceases to indicate that a search has concluded or has been stopped.

According to one embodiment, a title bar 335 is displayed immediately above the search and find pane 300 for displaying a title of the currently in-use data folder, for example, the "Inbox" data folder. After a search has been conducted on the currently in-use data folder, a parenthetical description of the results is appended to the title of the currently in-use data folder displayed in the title bar 335. For example, referring to FIG. 3, after a search on the text string "aaro," a parenthetical of "(results for "aaro")" is appended to the title "Inbox" for further clarifying to an end user that the presently displayed data in the display space 285 beneath the search and find pane 300 includes data items responsive to an executed search.

A clear/stop button 320 is provided to delete text from the textbox 310 immediately, thus clearing the search and find pane 300 and returning the current module view to its original state before any search and find operation was initiated. That is, selection of the "clear" button 320 clears a search string in the textbox 310 and clears any search results displayed responsive to a given search string. For example, if the contents of a currently in-use data folder, for example, the "Sent" mail folder were displayed in the display space 285 prior to the initiation of a search on the "Sent" data folder, and the search and find pane 300 is subsequently used for searching for particular items contained in the currently in-use data folder, the results of the search will be displayed in a results list in the display space 285 in place of the previously displayed contents of the in-use data folder. According to embodiments, selection of the clear/stop button 320 ends the operation of the search and find pane 310, clears the search string from the textbox 310, and returns the display of data in the user interface 200 to its display state prior to initiation of the search and find operation.

According to another embodiment, the button 320 may activate different functionalities based on the current context, and a text string displayed in the button 320 may be changed accordingly. For example, during an active search, the button 320 may be labeled with a text string such as "Stop," and selection of the "Stop" button may cause an active search to cease. After a search has been completed, the button may be labeled with a text string such as "Clear," as described above. Other functions, for example, refresh may be enabled for causing a refreshed or updated search on the same search query. In such a context, a text label such as "Refresh" may be applied to the button 320. As should be appreciated, the button 320 may be used (and labeled) according to many different contexts.

Other mechanisms may be used for returning the display of data in the user interface 200 to a pre-search state. For example, manually selecting the currently in-use data folder, for example, the "Sent" mail folder from the navigation pane 230, will end a search and find operation and will return a display of data in the user interface 200 to a pre-search state. Selection a different data folder or a different software module likewise will end a search and change the display state of the user interface 200 and its components to a different state.

If a search is in progress that is taking longer than a set amount of time, for example, 2 seconds, to return a set of search results, the text label for the clear/stop button 320 may be replaced with the text "Stop" for indicating to a user that the button may be used for stopping the presently in progress search and for returning currently available search results. Other methods for returning the user interface display to a pre-search state may include keyboard entries or shortcuts, for example, selection of the "Esc" key.

Adjacent to the clear/stop button 320 is an expanded search control 325, decorated with chevrons, according to one embodiment. The expanded search control 325 allows for expansion of the search and find pane 300 into an expanded search and find pane described below with reference to FIGS. 6 and 7.

According to an embodiment, a search status string may be displayed beneath the search textbox 310 for providing information about the search and for providing additional functionality applicable to the search. For example, if a search nets 200 items, and only 20 items may be displayed in a results list, described below, a text string may be displayed between the textbox 310 and the results list 500 for informing the user about the search. For example, a text string may be displayed, such as "The first 20 of 200 items." In addition, the text string may be enabled as a selectable link for providing additional functionality, for example, "Select here to retrieve the next 20 items."

Figure 5:
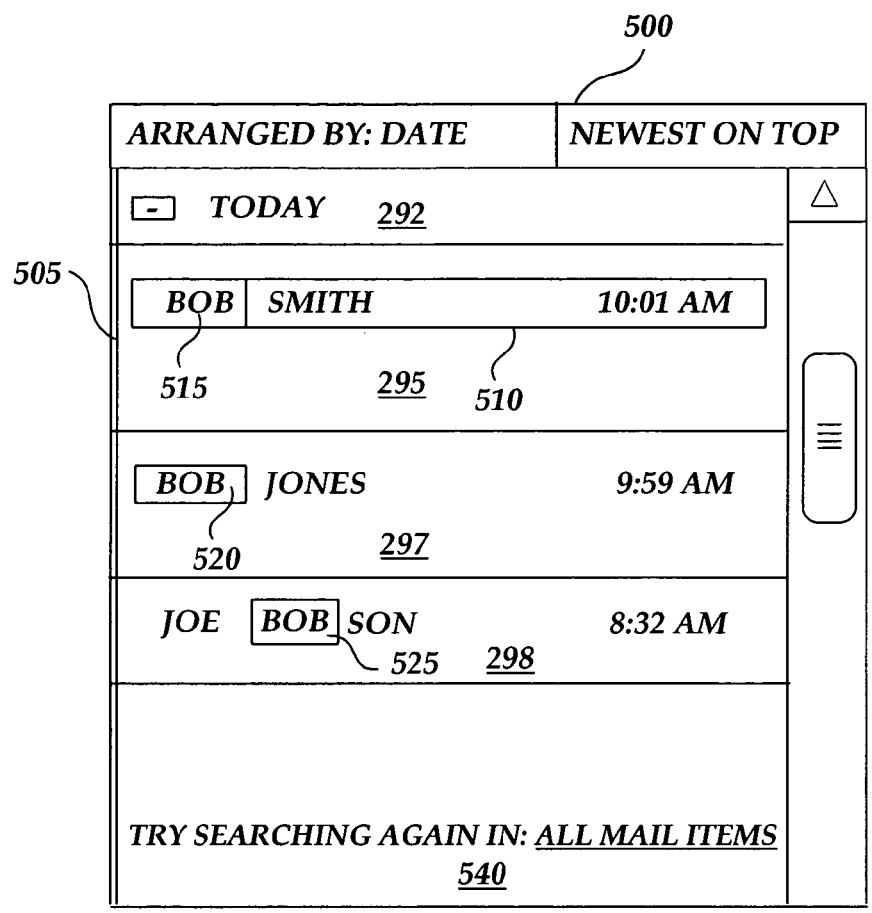
FIG. 5 illustrates a computer screen display showing a list of data responsive to a search and find operation.

Referring now to FIG. 5, a results list 500 is illustrated for providing a list of data items responsive to an executed search beneath the search and find pane 300, as illustrated in FIG. 2. According to embodiments, data retrieved as the result of an executed search and listed in the results list 500 may be listed according to a variety of listing orders selected by the end user. For example, the data may be arranged by date, by time, by alphabetical order or by any other arrangement property available to the currently in-use software module. According to one embodiment, to further clarify to an end user that the user is looking at a filtered set of search results rather than the normal view of all contents of a particular data folder, a vertical strip 505 is presented along the left edge of the results list 500. The vertical strip may be slightly highlighted for distinguishing the vertical strip from surrounding display colors.

According to an embodiment, a hit highlighting mechanism is provided for highlighting in each displayed result item the text string that was used for executing the search. For example, referring to FIG. 5, if a search of electronic mail items is conducted on a target data folder based on a search string of "Bob", then the string "Bob" is highlighted in each listed data item responsive to the search. For example, a first search result is listed for a person named "Bob Smith." The string "Bob" is highlighted by a highlighting field 515 to distinguish the text string as a hit associated with the returned data item. In addition, a highlighting bar 510 is applied to the entire first data item 295 illustrated in FIG. 5 to indicate that the first data item is the currently selected data item and to indicate that a preview of the selected (or focused on) item may be available in the preview pane 290. For another example, a third data item is illustrated in FIG. 5 and is associated with an electronic mail received from a person named "Joe Bobson." A highlighting field 525 is shown over the string "Bob," contained in the string "Bobson," for quickly indicating to the end user the reason this data item was returned in response to the executed search.

According to embodiments, hit highlighting may be applied to any text string contained in a displayed data item. For example, if a search string used for executing a search on a target data folder is found in the title or text of an attachment to a data item contained in the target data folder, for example, a word processing document attached to an electronic mail item, a title or excerpt from the attachment may be displayed immediately underneath the displayed data item, and the search text string may be highlighted in the displayed attachment title or excerpt.

Figure 8:
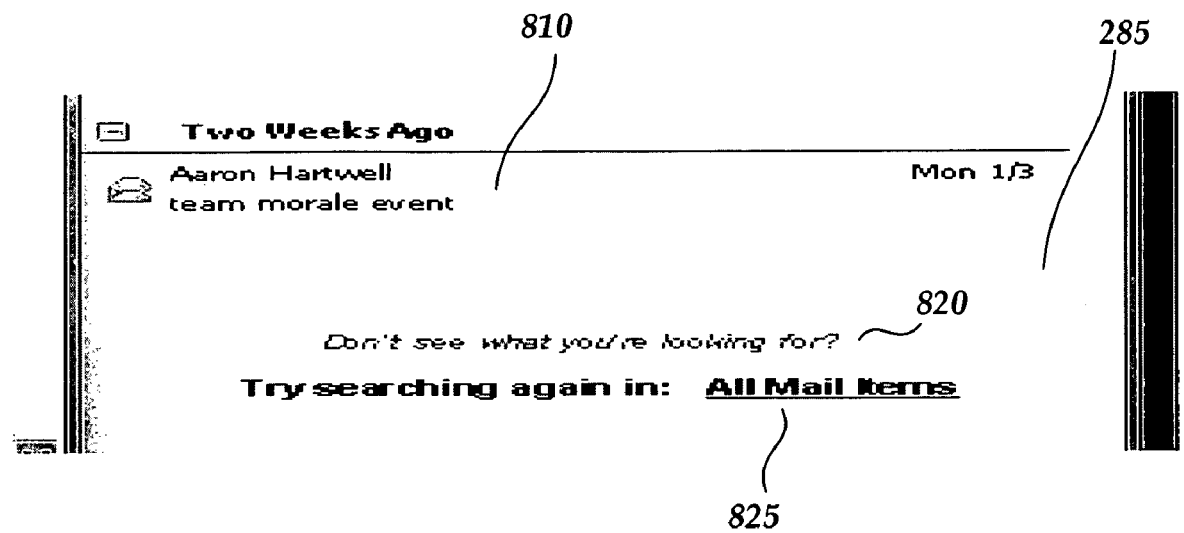
FIG. 8 illustrates a list of data responsive to a search and find operation and showing an upscoping link for expanding the scope of a search and find operation.

In a lower portion of the results list 500, an "Upscoping" link 540 is provided for automatically changing a scope of the executed search to a broader set of searched data. Operation of upscoping is described below with reference to FIGS. 8 and 9.

Expanded Search and Find

As described above, the search and find pane 300 allows for a searching and retrieval of data items from target data folders based on keywords or other alphanumeric strings entered into the search and find pane 300 for searching indexed data based on the entered alphanumeric text strings or keywords. Often the results of a search do not successfully retrieve one or more desired data items from the target data folder because the requesting user does not enter an appropriate keyword or alphanumeric search query for locating the desired data items. For example, the user may remember that an electronic mail message was received at some point in the past concerning an issue of importance to the user, but the user is unable to construct a keyword or other alphanumeric text string for use in the search and find pane 300 that efficiently locates the desired data item.

Figure 6:
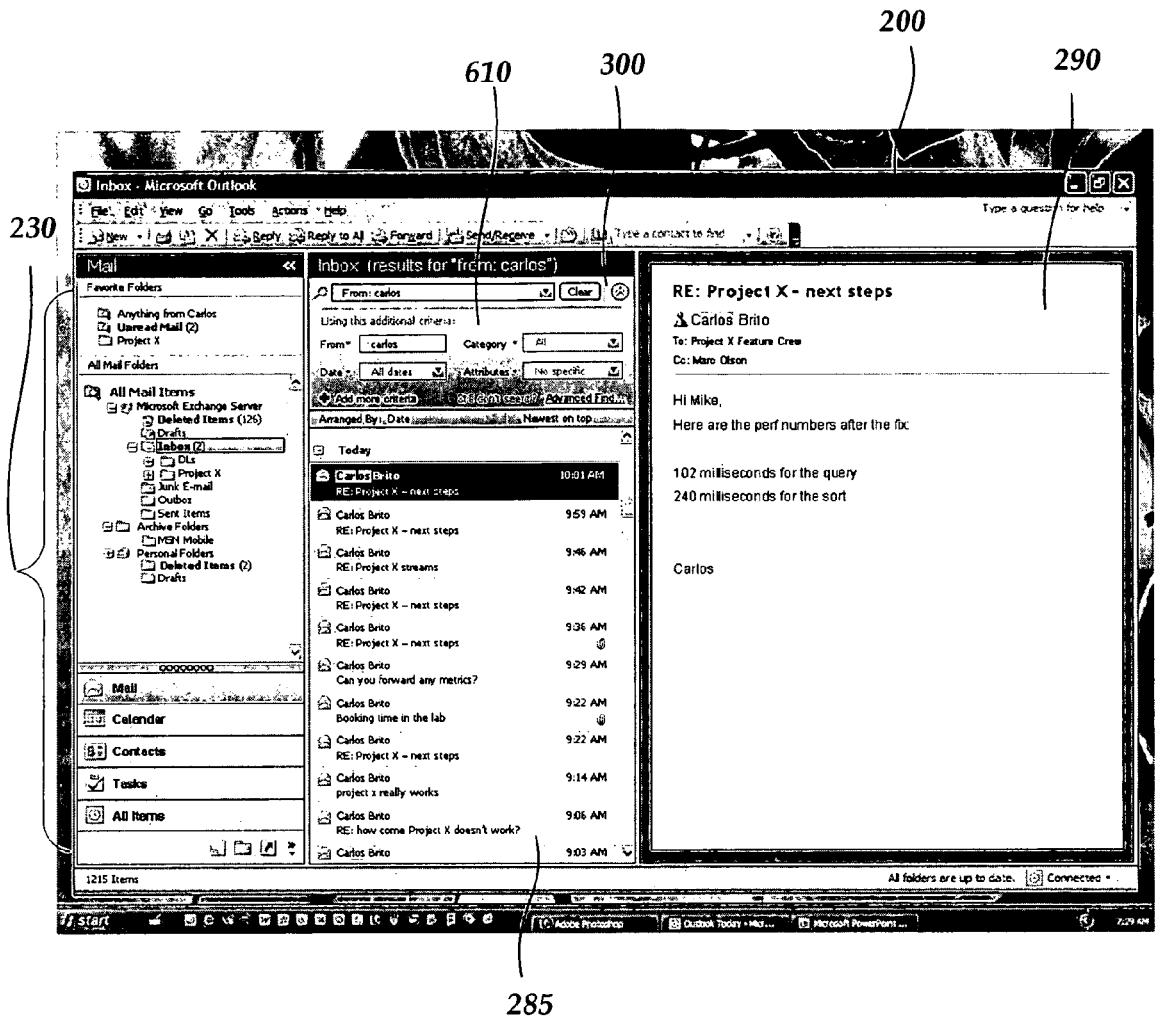
FIG. 6 illustrates a computer screen display of an electronic mail application user interface showing an expanded search and find user interface.

Referring now to FIG. 6, an expanded search and find pane 610 is provided for allowing a requesting user to execute a search on a target data folder that is based on specified landmark or key search criteria so that a more tailored search may be applied to the target data folder for locating the desired data items. According to an embodiment, a "landmark" refers to a "memorable aspect" or property of an item for which a search is conducted, for example, a party to whom a mail item is sent, or a time when a mail item was received, and the like. A relatively small number of key recall landmarks or search criteria are utilized in the expanded search and find pane 610 for allowing end users to focus on commonly used properties of data items so that tailored searches may be crafted. According to embodiments, a pre-selected set of landmark search criteria are provided through the expanded search and find pane 610 for each software module through which a search and find operation is executed. For example, if an electronic mail module is currently in use and an "Inbox" data folder is currently in use, then the expanded search and find pane 610 may be populated with a small number of textboxes associated with landmark search criteria that allow the user to tailor a search for electronic mail items.

Referring to FIG. 6, example landmark search criteria textboxes include a "From" box for finding mail from a particular party, a "Date" box for finding mail received on a particular date, a "Category" box, and an "Attributes" box for finding mail with selected attributes, for example, whether a given mail item includes attachments, is unread, is flagged, includes links, and the like. As should be appreciated, if the expanded search and find pane 610 is open through another software module, for example, a calendar software module, then the expanded search and find pane 610 may allow for tailored searches based on other landmark search criteria, for example, meeting times, meeting dates, meeting attendees, and the like.

Figure 7:
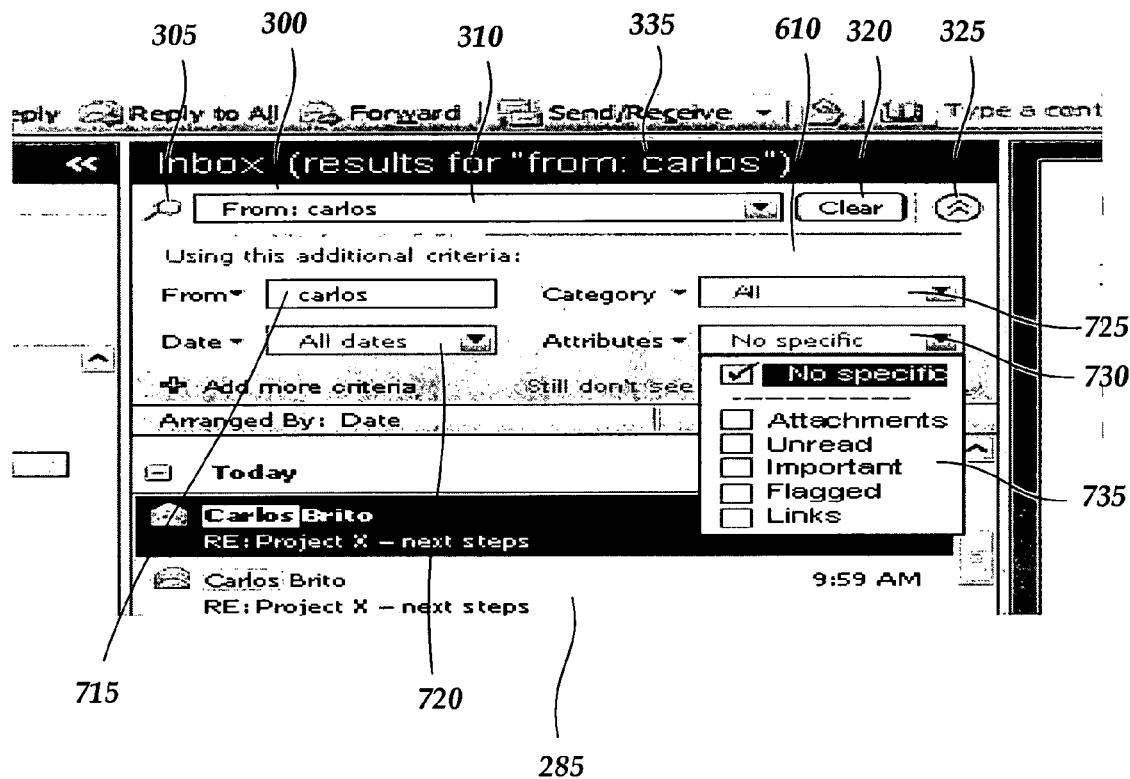
FIG. 7 illustrates a computer screen display of an expanded search and find user interface.

Referring now to FIG. 7, the expanded search and find pane 610 is positioned immediately beneath the search and find pane 300, described above. As described above with reference to FIGS. 3 and 4, the expanded search and find pane 610 is launched by selection of the expanded search button 325. Upon selection of the button 325, the expanded search and find pane 610 automatically deploys as illustrated in FIGS. 6 and 7. In order to collapse or dismiss the expanded search and find pane 610, the button 325 is selected a second time. According to embodiments, the expanded search and find pane 610 includes background colors, shadings or gradient to set it off from surrounding display space and controls in the same manner as is used for the search and find pane 300.

A number of search criteria textboxes are made available to a searching user for tailoring an expanded search and find request. As illustrated in the pane 610, a number of textboxes 715, 720, 725, 730 are provided, and a requesting user may enter alphanumeric text strings in each of the provided textboxes or select a string or term from a dropdown menu associated with a given textbox for creating a search query. For example, the first textbox 715 is illustrated as a "From" textbox and may be used to enter a text string associated with the sender of an electronic mail item. The second textbox 720 is illustrated as a "Date" textbox and may be used to enter or select a date associated with an electronic mail item. The third textbox 725 is illustrated as a "Category" textbox and may be used to enter or select a mail category associated with an electronic mail item. A fourth textbox 730 is illustrated as an "Attributes" textbox and may be used to enter or select attributes that are associated with a desired mail item, for example, attachments, importance level, and the like.

As illustrated in FIG. 7, a selectable control titled "Add more criteria" is provided for allowing a user to add additional search criteria textboxes and for applying one or more desired landmark terms or criteria to added textboxes. In order to customize existing textboxes, the criteria textbox label, for example "From," is selected to deploy a drop down menu from which a new criteria may be selected for customizing the search criteria textboxes provided in the expanded search and find pane 610. For example, if a user would like to change the first search criteria associated with the textbox 715 from a "From" criteria to a "To" criteria, a drop down menu may be deployed for selecting a "To" criteria. Once the "To" criteria is selected, the word "From" illustrated next to the textbox 715 will be replaced with the word "To," and the underlying functionality of the pane 610 will be changed to apply text entered into that textbox to properties of searched mail items associated with recipients of mail items. As should be appreciated, each of the illustrated textboxes may be modified to receive keywords or other alphanumeric text strings associated with many different criteria. Example search criteria that may be applied to the textboxes 715, 720, 725, 730 include body, categories, courtesy copy ("cc"), contacts, created by, due by, flag color, follow-up, from, importance, message, received, sensitivity, status, sent, subject, and the like. Thus, a user may tailor the expanded search and find pane 610 by specifying the types of search criteria that will be applied to a given search.

In addition, for some criteria, for example, date, category, attributes, sensitivity, flag color, categories, importance, attributes or any other criteria having selectable ranges of key terms or properties, an additional drop down menu may be enabled under the textbox, as is illustrated for the drop down menu 735 in FIG. 7. For example, for an "Attributes" criteria, a drop down menu is enabled to allow a user to craft an expanded search by selecting one or more attributes or properties that may be associated with a desired item, for example, whether the item includes attachments, whether the item is unread, whether the item is marked as important, whether the item is flagged, or whether the item includes links. For another example, if the user modifies the expanded search and find pane 610 to include a category for "Flag color," for example, a drop down menu 735 may be enabled under the flag category textbox for picking from available flag colors, such as red, blue, green, yellow, and the like. For another example, if a "Date" criteria is applied to the expanded search and find pane 610, a drop down menu may be enabled which allows selection of specified dates including today, yesterday, this week, this month, this year, within last three days, within last two weeks, within last two months, within last one year, and the like. As should be appreciated, when a particular attribute is selected from such a drop down menu 735, the selected attribute is automatically populated into the associated textbox 730 for applying to the associated search.

According to one embodiment, while the expanded search and find pane 610 may be modified to include different sets of search criteria, as described above, certain default sets of search criteria are provided for the expanded search and find pane 610 in association with certain software modules. For example, for an electronic mail module, search criteria of from, date, category and attributes are applied to the pane 610, as illustrated in FIG. 7. For a calendar module, default search criteria applied to the pane 610 include organizer (from), category, date range, and special attributes. For a contact module, default search criteria applied to the pane 610 include name, company/organization, phone number (primary) and special attributes. For a notes module, search criteria applied to the pane 610 include keyword, date, label, and special attributes. For a journal module, search criteria that may be applied to the pane 610 by default include keyword, date, type, and special attributes. As should be appreciated, these default sets of search criteria applied for different software modules are organized for guiding a requesting user through an efficient expanded search for data items in target data folders associated with certain software modules. However, as described above, the expanded search and find pane may be modified by selecting different or additional search criteria for inclusion in the pane 610 and by selecting the "Add more criteria" control for adding additional search criteria to a given set of search criteria included in the pane 610.

In operation, the expanded search and find pane 610 may be used for crafting a tailored search query directed to an in-use storage data folder, for example, the "Inbox" data folder, the "Sent" data folder, or a variety of other data folders associated with other software modules, for example, calendar modules, contacts modules, etc. For example, if an electronic mail module is currently in use, and a "Project A" mail folder is currently being reviewed, a tailored search may be applied to the in-use mail folder for finding a particular mail item where the user is having difficulty constructing an appropriate keyword search or other alphanumeric string for use with the search and find pane 300, described above. After the user launches the expanded search and find pane 610, the user may enter a name from which the desired electronic mail item was received into the textbox 715. The user may then select a date, for example, "this week" from a drop down menu associated with the date textbox 720. The user may then select a category of electronic mail items to be applied to the search. If the user is unsure of a particular category with which the desired electronic mail item is associated, the user may select the "all" category. Then, if the user remembers that the desired electronic mail item included an attachment, the user may select an attachment attribute from the "Attributes" textbox drop down menu 735.

According to embodiments, as the search is being crafted by the requesting user, as described above, a search string associated with the search criteria selected and/or entered by the user is populated into the textbox 310 of the search and find pane 300 positioned above the expanded search and find pane 610. Thus, as the user crafts a tailored search query utilizing the expanded search and find pane 610, the user is able to see the syntax and structure of a search query populated into the textbox 310 of the search and find pane 300 in response to the search criteria selected from the expanded search and find pane 610. For example, a search string entered into the textbox 310 of the search and find pane 310 may take the form of "From: Carlos, Date: this week, Category: all, attachment." As should be appreciated, this search string is for purposes of illustration and does not illustrate a particular search string syntax or structure that may be use according to embodiments of the invention.

Displaying the tailored search string in the textbox 310 of the search and find pane 300 in response to the application of search criteria via the expanded search and find pane 610 is advantageous from both a quality control and user learning standpoint. From a quality control standpoint, if the search string being populated into the textbox 310 in response to the search criteria applied by the user does not appear accurate to the user in any way, for example, where a date criteria looks inaccurate, or where an attributes criteria appears inaccurate, the user may modify the search criteria and keywords or other alphanumeric text strings applied to the expanded search before the search is performed. Alternatively, the user may modify the search criteria or keywords after the search is performed if the results of the search are not satisfactory.

From a user learning standpoint, display of the search string in the textbox 310 allows a user to learn the syntax and text string structure utilized by the search and find pane 300 in response to search criteria applied to a given search via the expanded search and find pane 610. For example, if in response to the application of certain search criteria and the entry of certain keywords or other alphanumeric text, a search string in the form of "From: Carlos, Date: this week, Category: all, attachment" is populated into the textbox 310 of the search and find pane 300, the user will begin to learn the syntax and structure of search strings created in response to various search criteria and keywords applied to a given search. Once the user has learned the syntax and structure of search strings applied in response to the selection of various search criteria and the use of various keywords or other alphanumeric strings, the user may subsequently be able to enter a search string directly into the textbox 310 of the simplified search and find pane 300 that includes search criteria, certain keywords and other alphanumeric strings without the need for launching and using the expanded search and find pane 610. That is, by learning the syntax and structure applied to search queries by the expanded search and find pane 610, the user may enter complex search queries directly into the textbox 310 of the simplified search and find pane 300 for execution of expanded searches without using the expanded search and find pane 610.

Once the search query is developed through selection of the various search criterion, the tailored search may be executed by selecting a carriage return, keyboard shortcut, or by selecting an execute button, such as the "Go" button 340, illustrated in FIG. 4. Or, if a "word-wheeling" mechanism is enabled, as described above, the query is immediately executed and updated upon entry of different or additional characters. As described above with reference to the search and find pane 300, searches executed via the expanded search and find pane 610 are executed on indexed data associated with an in-use or target data folder for increasing efficiency and speed of search and data retrieval. In response to the executed search, results from the search are provided in a results list 500 in the display space 285 of the user interface 200, as illustrated and described above with reference to FIGS. 2 and 5. As described above, hits highlighting applied to search criteria associated with the search is provided for indicating to a reviewing user why a particular data item was returned in response to the executed search.

Broadened Search and Find (Upscoping)

As described above with reference to FIGS. 1-7, a search query may be directed to an in-use data folder by entry of a search string into the simplified search and find pane 300 or by use of the expanded search and find pane 610 for tailoring a more complex and specific search query. Often, a user is working in a particular data folder, for example, a "Sent" mail folder or "Unread" mail folder, and the user directs her search queries to data items contained in the in-use data folder. If the results returned from execution of a given search query on the in-use folder are not satisfactory in that a desired data item is not returned, the user must expand the search to a broader set of data items. According to embodiments of the present invention, a "upscoping" mechanism is provided for allowing a user to quickly and automatically expand the scope of a present search query to all data items associated with a given software module. If a search is directed to a data folder that is a subset of an overall parent data folder, for example, where a search is directed to a "Sent" mail folder which is a subfolder of an "All mail" folder, different means are available for automatically upscoping a search initially directed to the subfolder to a larger data folder containing additional data items to which the search may be applied.

Referring now to FIGS. 5 and 9, after a search is directed to a given data folder via the search and find pane 300 or the expanded search and find pane 610, as described above, if the search was directed to a subfolder, an "upscoping" link 540, 825 is automatically populated below the list of data items returned in response to the previous search. The link 540, 825 may be accompanied by an explanatory text string such as "Don't see what you're looking for?" or "Try searching again in:" followed by a display of the "upscoping" link 540, 825. According to embodiments, if a user selects the "upscoping" link, for example the "All Mail Items" link 825, the presently applied search string via the simplified search and find pane 300 or the expanded search and find pane 610 is automatically applied to all data items contained in all data folders included under "All Mail Items." For example, if a user first applies a search via the pane 300 or pane 610 directed at the "Sent" mail folder, and the user does not receive desired results, the link populated below the results list will allow the user to selectively apply the present search query entered via the pane 300 or pane 610 against all mail items contained in all mail folders, for example, "Sent" mail, "Inbox" mail, "Unread" mail, "Deleted" mail, and the like. As will be described below, if the present software module in use is a different module, for example, a calendar module, then the link provided below the results list will allow application of a present search query against all data items of the different module, for example, all calendar items.

According to embodiments, a second means for automatically upscoping a present search to all data items associated with a presently in-use software module includes selecting an "All 'module' items" control from the navigation pane 230, where "module" represents the currently in-use software module (e.g., mail, calendar, contacts, etc.). If a present search query, for example, "mail from Bob," is applied to a presently in-use "Sent" mail folder via the search and find pane 300, and the desired mail item is not found, the user may select the "All mail" folder 275 from the navigation pane 230, for example, by mouse clicking the "All mail" control 275, and the search string originally applied to the "Sent" mail folder will automatically be applied to the "All mail" folder. In either case where upscoping is executed by selecting the upscoping link 540, 825, or where upscoping is executed by selecting the "All 'module' items" control from the navigation pane 230, the search string originally applied to the presently in-use data folder is applied to the larger parent folder, and results responsive to the search query are returned and are displayed in the results list 500, described above with reference to FIG. 5.

Referring now to FIG. 9, example navigation panes for different software modules are illustrated showing the "All 'module' items" controls and various subfolders available under each of the different software modules. As should be appreciated, the example navigation panes and selectable controls illustrated in FIG. 9 are for purposes of example only and are not limiting of the different types of navigation panes and selectable controls that may be utilized according to embodiments of the present invention. As illustrated in FIG. 9, a navigation pane 910 for an electronic mail module includes "All Mail Items" control for applying a search query to all mail items contained under the electronic mail module. A navigation pane 920 is illustrated for a calendar module, and an "All Calendars" control is illustrated for selectively applying a search query against all calendars, for example, personal calendars, business calendars, social calendars, and the like stored under an associated calendar application. A navigation pane 930 is illustrated for a contacts module having an "All Contacts" control for selectively applying a search query to all contacts data folders associated with the contacts module. A navigation pane 940 is illustrated for a tasks module and provides an "All Tasks" control for selectively applying a search query against all tasks folders associated with a task module. A navigation pane 950 is illustrated for a notes module and provides an "All Notes" control for selectively applying a search query to all notes folders associated with a notes module. A navigation pane 960 is illustrated for a journal module and shows an "All Journals" control for selectively applying a search query to all journal folders associated with a journal module.

Figure 10:
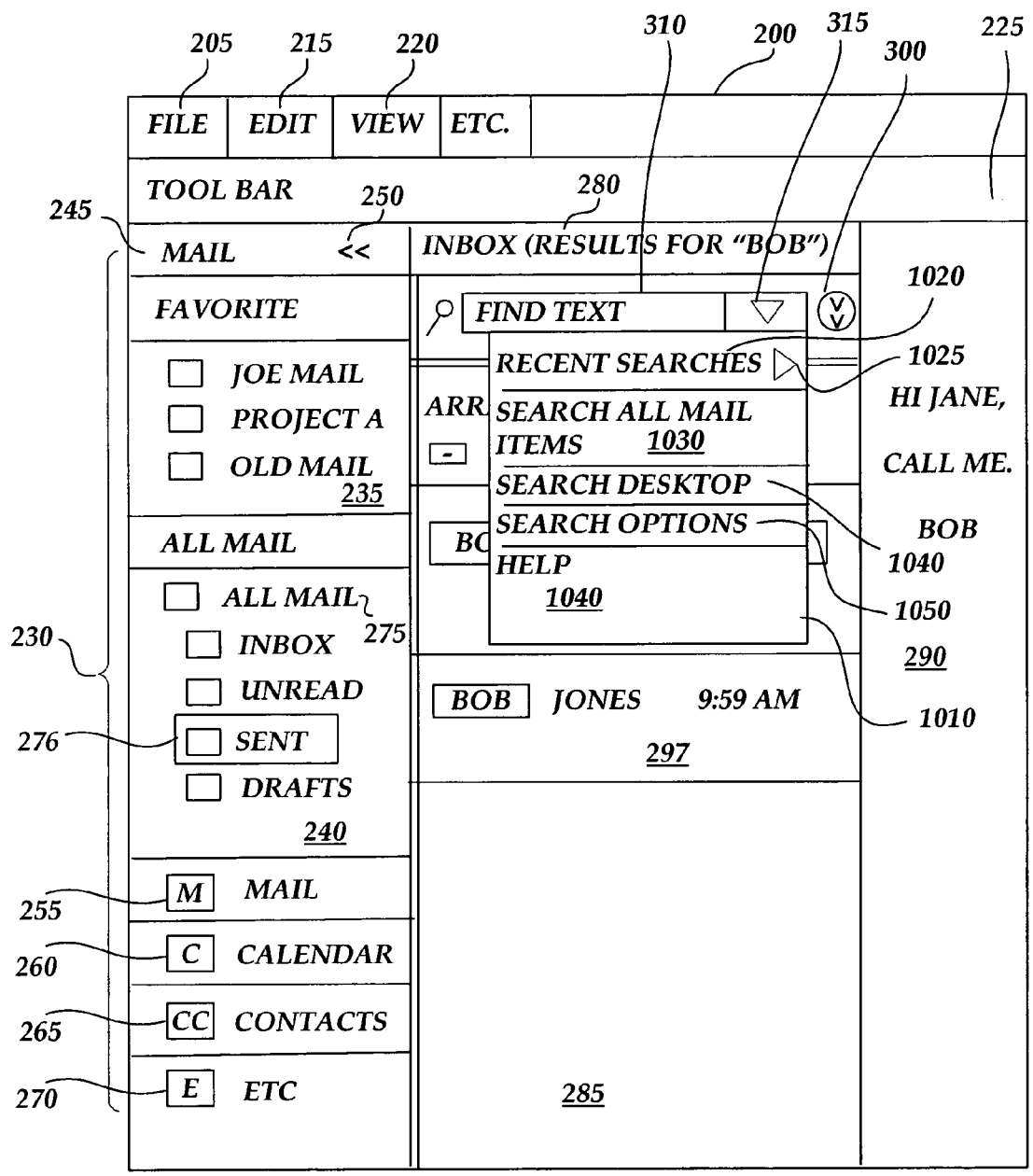
FIG. 10 illustrates the computer screen display of FIG. 2, showing a dropdown menu for selectively changing the scope of a given search operation, or for obtaining one or more additional functionalities.

FIG. 10 illustrates the computer screen display of FIG. 2, showing a dropdown menu for selectively changing the scope of a given search operation, or for obtaining one or more additional functionalities. As illustrated in FIG. 10, the dropdown menu 1010 may be deployed by selection of the control 315. The dropdown menu 1010 may include one or more selectable controls for changing the scope of a given search or for obtaining additional functionality of the associated software module. For example, a "Recent Searches" control 1025 may be selected for deploying a list of most recently used search strings, as described above. A "Search All Mail Items" control 1030 may be selected for upscoping a current search from a given search folder to a larger search folder, as described above with reference to FIGS. 8 and 9. A "Search Options" control 1050 may be selected for providing one or more selectable options associated with the search function in use. A "Help" control 1050 may be selected for obtaining help content associated with searches directed to the current search context, or for obtaining general help content associated with the software module in use.

According to an embodiment, a "Search Desktop" control 1040 is provided for upscoping a search from the current search scope to an operating system level desktop scope with which the contents of a memory storage of the associated computer 100 may be searched. In this case the current search takes the form of a child data folder search, and the desktop takes the form of a parent data folder, as described above with reference to FIGS. 8 and 9. For example, according to one embodiment, selection of the "Search Desktop" control 1040 causes a launching and initiation of a "Desktop" search function, such as the WINDOWS® Desktop Search function. The search query currently in use is automatically populated into the Desktop Search function for initiation of the search. As should be appreciated, the search applied via the Desktop Search function may be applied to memory stored on the local computer 100, or the search may be applied to memory stored via a distributed network, such as remotely located servers or such as memory locations available via an intranet or the Internet. As should be appreciated, results of such an "upscoped" search may be displayed in an appropriate results list of the Desktop Search function.

As described herein, a search and find user interface is provided that is integrated with a data indexing engine to allow efficient and high-speed data search and retrieval across data storage folders associated with a given software module or associated with a number of disparate software modules. An expanded form of the search and find user interface is provided for advanced searching, and where searching is required beyond a present search scope, an automatic "upscoping" mechanism is provided for expanding a search to data storage folders outside a current data storage folder on which an initial search is executed. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for providing a search and find functionality in a software module, the method comprising:
    displaying, by a computing device, a user interface containing a navigation pane, a search and find user interface element, and a list pane, the navigation pane containing a list of one or more selectable data folder controls associated with data storage folders in a set of data storage folders, each data storage folder in the set of data storage folders associated with one or more data items belonging to a data item type;
    displaying, by the computing device, a first textbox disposed in the search and find user interface element for receiving free form alphanumeric entry of search queries;
    displaying, by the computing device, a second textbox within the search and find user interface element, the second textbox associated with a landmark property of data items of the data item type;
    receiving, by the computing device, a selection of a target data folder control in the list of one or more selectable data folder controls, the target data folder control associated with an target data storage folder in the set of data storage folders, the selection of the target data folder control operatively associating the search and find user interface element with the target data storage folder;
    after operatively associating the search and find user interface with the target data storage folder, receiving, at the computing device, a search string into the second textbox;
    in response to receiving the search string, automatically populating, by the computing device, a structured search query into the first textbox, the structured search query for finding data items having values of the landmark property that correspond to the search string;
    receiving, at the computing device, an indication of an initiation of the structured search query against the target data storage folder; and
    in response to receiving the indication of the initiation of the structured search query, displaying, by the computing device, a results list in the list pane, the results list containing any data items associated with the given data storage folder responsive to the structured search query.

2. The method of claim 1, further comprising displaying, by the computing device, a status field disposed in the user interface, the status field displaying status information about data items in the results list.

3. The method of claim 1, prior to displaying the results list, returning by the computing device, any data items associated with the target data storage folder where the any data items are responsive to the structured search query.

4. The method of claim 1, further comprising, if the search string is present in a displayed portion of any of the data items in the results list, highlighting, by the computing device, the search string in the displayed portion.

5. The method of claim 1, further comprising displaying, by the computing device, a progress indicator in the search and find user interface element, the progress indicator providing an animation during any active search operation, the animation indicating a progression of the active search operation.

6. The method of claim 1, further comprising displaying, by the computing device, a narrow bar vertically disposed in the user interface along an edge of the results list, the narrow bar indicating that the results list contains one or more data items responsive to a search of the target data storage folder and indicating that the target data storage folder is in a filtered state.

7. The method of claim 1, further comprising displaying, by the computing device, a dropdown menu disposed in the user interface, the dropdown menu providing one or more additional search functionalities associated with the search and find user interface element.

8. The method of claim 7,
    wherein at least one of the one or more additional search functionalities includes a most recently used search query control that, when selected, causes a display of one or more previously entered search queries, and
    wherein the method further comprises:
        receiving, by the computing device, a selection of one of the one or more previously entered search queries, and
        automatically entering, by the computing device, the selected one of the one or more previously entered search queries into the first textbox for processing a search query against the target data storage folder.

9. The method of claim 8, further comprising receiving, by the computing device, an indication of a selection of a search control for initiating a search query against the target data storage folder based on the selected one of the one or more previously entered search queries.

10. A computing device configured to present a search and find user interface, the computing device comprising:
    a processing unit; and
    a system memory comprising instructions that, when executed by the processing unit, configure the computing device to:
        display a user interface associated with a software module, the user interface containing a navigation pane, a search and find user interface element, a list pane and a data preview pane, the navigation pane containing a list of one or more selectable data folder controls associated with data storage folders in a plurality of data storage folders, each data storage folder in the plurality of data storage folders associated with data items belonging to a data item type associated with the software module, the list pane displaying data items from a given data storage folder in the plurality of data storage folders;

display a first textbox disposed in the search and find user interface element for receiving free form alphanumeric entry of search queries;

display a second textbox within the search and find user interface element, the second textbox associated with a landmark property of data items belonging to the data item type;

receive a selection of a target data folder control in the list of one or more selectable data folder controls, the target data folder control associated with a target data storage folder in the set of data storage folders, the selection of the target data folder control operatively associating the search and find user interface element with the target data storage folder;

after operatively associating the search and find user interface with the target data storage folder, receive a search string entered into the second textbox;

in response to receiving the search string, automatically populate a structured search query into the first textbox, the structured search query for finding data items having values of the landmark property that correspond to the search string;

after automatically populating the structured search query into the first textbox, receive an indication of an initiation of the structured search query against the target data storage folder; and in response to receiving the indication of the initiation of the structured search query, display a results list in the list pane, the results list containing any data items associated with the target data storage folder responsive to the structured search query.

11. The computing device of claim 10, the instructions further configuring the computing device to display, in the search and find user interface element, a clear control that, when selected, causes a clearing of search queries entered into the first textbox.

12. The computing device of claim 11, the instructions further configuring the computing device to display, in the search and find user interface element, a progress indicator disposed in the search and find user interface element, the progress indicator providing an animation during any active search operation, the animation indicating a progression of the active search operation.

13. The computing device of claim 12, the instructions further configuring the computing device to display, in the list pane, a narrow bar disposed vertically along an edge of the results list, the narrow bar indicating the results list contains one or more data items responsive to a search of the given data storage folder.

14. The computing device of claim 12, the instructions further configuring the computing device to display, in the search and find user interface element, a most recently used search query control disposed adjacent to the first textbox, the most recently used search query control, when selected, causing the computing device to display one or more search queries previously entered into the first textbox.

15. A computer storage medium containing computer executable instructions for providing a search and find functionality, the computer executable instructions when executed by a computer, configure the computer to:

display a user interface of a multi-functionality application, the user interface including a search and find user interface element, a navigation pane, a list pane, and a data preview pane, the search and find user interface element disposed within the user interface in close proximity to the navigation pane, the navigation pane containing a plurality of selectable folder controls, each selectable folder control in the first plurality of selectable folder controls representing a data storage folder in a first plurality of data storage folders, the search and find user interface element containing a first textbox for receiving free form alphanumeric entry of search queries from a user, the search and find user interface element displayed in the user interface by default, the list pane containing by default a list of all data items in a first data storage folder in the first plurality of data storage folders, the data preview pane displaying by default contents of a selected data item in the first data storage folder;

receive a module selection input from a user;

in response to receiving the module selection input:
  display a second plurality of selectable data folder controls in the navigation pane, each selectable data folder control in the second plurality of selectable data folder controls associated with a different data storage folder in a second plurality of data storage folders;
  display a second textbox within the search and find user interface, the second textbox associated with a landmark property of data items of a data item type associated with a software module of the multi-functionality application indicated by the module selection input;

receive folder selection input from the user, the folder selection input indicating selection of a target selectable folder control in the second plurality of the selectable folder controls, the target selectable folder control representing a target data storage folder in the second plurality of data storage folders;

in response to receiving the folder selection input, operatively associate the search and find user interface element with the target data storage folder;

receive from the user an alphanumeric search string in the second textbox;

in response to receiving the alphanumeric search string in the second textbox, automatically populate a structured search query into the first textbox, the structured search query for finding data items having values of the landmark property that correspond to the alphanumeric search string;

after operatively associating the search and find user interface element with the target data storage folder and after automatically populating the structured search query into the first textbox, receive an indication of an initiation of the structured search query against the target data storage folder;

in response to receiving the indication of the initiation of the structured search query, display a results list within the list pane, the results list containing any data items associated with the target data storage folder responsive to the structured search query; and highlight displayed portions of data items in the results list, the displayed portions containing the alphanumeric search string.

16. The computer storage medium of claim 15, the instructions further configuring the computer to display a progress indicator in the search and find user interface element, the progress indicator providing an animation during any active search operation, the animation indicating a progression of the active search operation.

17. The computer storage medium of claim 15, the instructions further configuring the computer to display a narrow bar vertically disposed in the user interface along an edge of the results list, the narrow bar indicating the results list contains one or more data items responsive to a search of the target data storage folder.

18. The computer storage medium of claim 15, the instructions further configuring the computer to:
- display in the user interface a most recently used search query control adjacent to the first textbox, the most recently used search query control, when selected, causes the computer to display one or more previously entered search queries, the previously entered search queries being search queries previously entered in the first textbox;
- receive a selection of one of the one or more previously entered search queries;
- in response to receiving the selection of one of the one or more previously entered search queries, automatically enter the selected one of the one or more previously entered search queries into the first textbox; and
- receive an indication of a selection of a search control for initiating a second search query against the target data storage folder, the second search query based on the selected one of the one or more previously entered search queries.

* * * * *

UNITED STATES PATENT AND TRADEMARK OFFICE
CERTIFICATE OF CORRECTION

| | | |
|---|---|---|
| PATENT NO. | : 7,739,259 B2 | Page 1 of 1 |
| APPLICATION NO. | : 11/430561 | |
| DATED | : June 15, 2010 | |
| INVENTOR(S) | : Aaron Hartwell et al. | |

It is certified that error appears in the above-identified patent and that said Letters Patent is hereby corrected as shown below:

In column 22, line 1, in Claim 15, delete "instructions" and insert -- instructions, --, therefor.

Signed and Sealed this

Fifteenth Day of February, 2011

David J. Kappos
*Director of the United States Patent and Trademark Office*